US012671875B2

(12) United States Patent
Wang et al.

(10) Patent No.: US 12,671,875 B2
(45) Date of Patent: Jun. 30, 2026

(54) LIVE-STREAM PREVIEW METHOD, APPARATUS, ELECTRONIC DEVICE AND STORAGE MEDIUM

(71) Applicant: Beijing Zitiao Network Technology Co., Ltd., Beijing (CN)

(72) Inventors: Jinxin Wang, Beijing (CN); Teer Ba, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/651,444

(22) Filed: Apr. 30, 2024

(65) Prior Publication Data

US 2024/0284015 A1 Aug. 22, 2024

Related U.S. Application Data

(63) Continuation of application No. PCT/CN2022/113867, filed on Aug. 22, 2022.

(30) Foreign Application Priority Data

Oct. 30, 2021 (CN) .......................... 202111278254.6

(51) Int. Cl.
*H04N 21/81* (2011.01)
*H04N 21/2187* (2011.01)
(Continued)

(52) U.S. Cl.
CPC ..... *H04N 21/8133* (2013.01); *H04N 21/2187* (2013.01); *H04N 21/47* (2013.01);
(Continued)

(58) Field of Classification Search
None
See application file for complete search history.

(56) References Cited

U.S. PATENT DOCUMENTS

2010/0325562 A1 12/2010 Andrews
2012/0154449 A1* 6/2012 Ramagem ............. G06F 3/0346
345/157
(Continued)

FOREIGN PATENT DOCUMENTS

CN 105915932 A 8/2016
CN 109151604 A 1/2019
(Continued)

OTHER PUBLICATIONS

International Search Report for PCT/CN2022/113867, mailed Nov. 11, 2022, 7 pages.
(Continued)

*Primary Examiner* — Joshua D Taylor
(74) *Attorney, Agent, or Firm* — Astute IP Law Group

(57) ABSTRACT

The present disclosure relates to a live-stream preview method, apparatus, electronic device and storage medium. The method includes: displaying an event promotion control on a page corresponding to a live-stream event created by a first user; and in response to a trigger operation on the event promotion control, turning on the event promotion control on the page corresponding to the live-stream event to add preview information of the event to be live-streamed to a video posted by the first user.

17 Claims, 22 Drawing Sheets

(51) Int. Cl.

| | |
|---|---|
| *H04N 21/47* | (2011.01) |
| *H04N 21/8405* | (2011.01) |
| *H04N 21/854* | (2011.01) |
| *H04N 21/858* | (2011.01) |

(52) U.S. Cl.

CPC ....... *H04N 21/8405* (2013.01); *H04N 21/854* (2013.01); *H04N 21/858* (2013.01)

(56) References Cited

U.S. PATENT DOCUMENTS

| | | | | |
|---|---|---|---|---|
| 2018/0077469 | A1* | 3/2018 | Geduldig | H04N 21/4316 |
| 2018/0351756 | A1* | 12/2018 | Dave | H04N 21/4788 |
| 2019/0020922 | A1* | 1/2019 | Sengupta | H04N 21/25841 |
| 2019/0253751 | A1* | 8/2019 | Lin | H04N 21/4316 |
| 2021/0374797 | A1* | 12/2021 | Hasan | G06Q 30/0246 |

FOREIGN PATENT DOCUMENTS

| | | | |
|---|---|---|---|
| CN | 110536147 | A | 12/2019 |
| CN | 111327916 | A | 6/2020 |
| CN | 111918085 | A | 11/2020 |
| CN | 112468866 | A | 3/2021 |
| CN | 113015012 | A | 6/2021 |
| CN | 306777919 | S | 8/2021 |
| JP | 6587725 | B1 | 10/2019 |
| JP | 2020191620 | A | 11/2020 |
| WO | 2019171128 | A1 | 9/2019 |

OTHER PUBLICATIONS

Office Action for Chinese Patent Application No. 202111278254.6, mailed on Mar. 28, 2025, 17 pages.
Notice of Reasons for Refusal for Japanese Patent Application No. 2024-525598, mailed on May 13, 2025, 4 pages.
Extended European Search Report received for European Patent Application No. 22885360.2, mailed on Nov. 26, 2024, 10 pages.

* cited by examiner

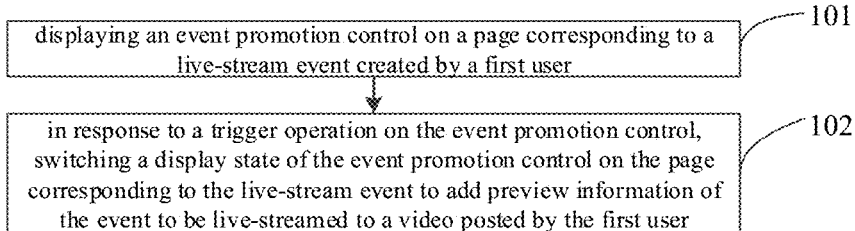

displaying an event promotion control on a page corresponding to a live-stream event created by a first user                                    ⌐101 in response to a trigger operation on the event promotion control, switching a display state of the event promotion control on the page corresponding to the live-stream event to add preview information of the event to be live-streamed to a video posted by the first user                                    ⌐102

FIG. 1

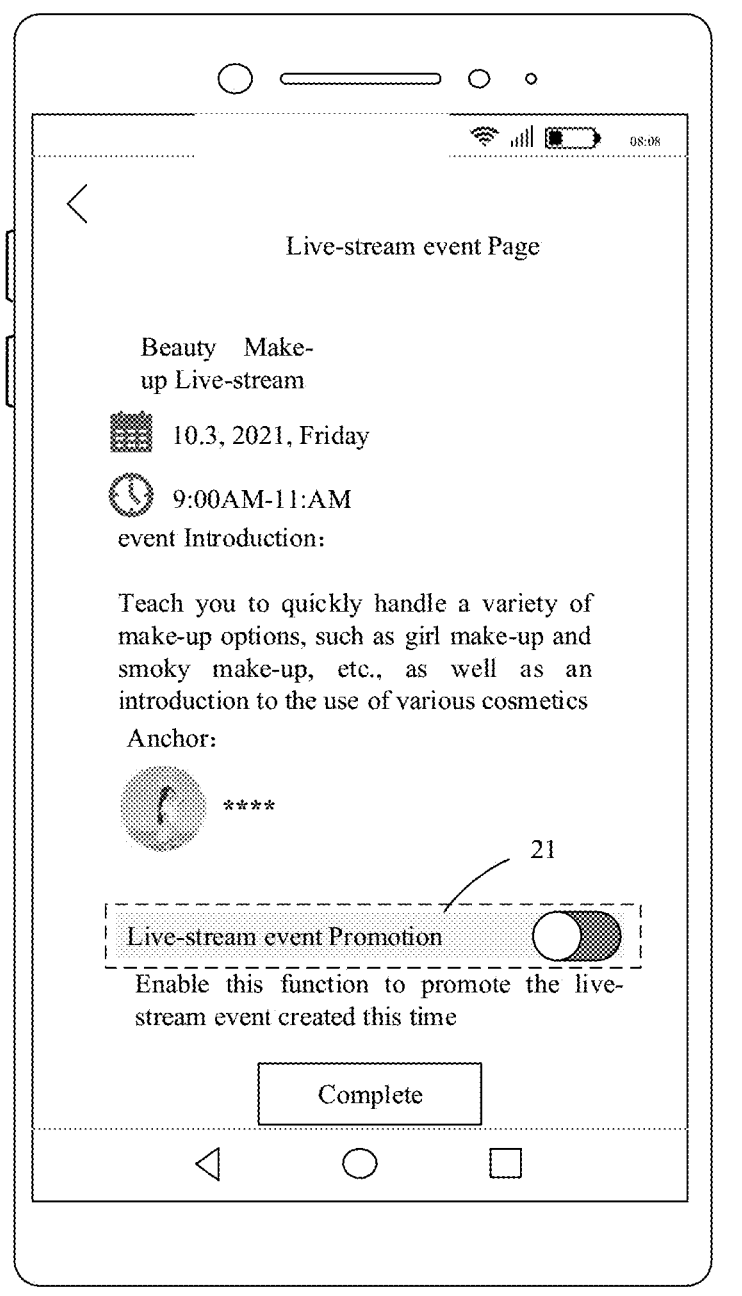

FIG. 2

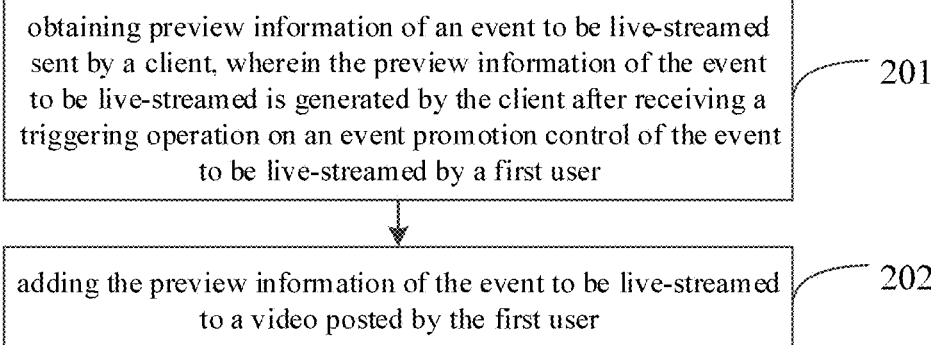

obtaining preview information of an event to be live-streamed sent by a client, wherein the preview information of the event to be live-streamed is generated by the client after receiving a triggering operation on an event promotion control of the event to be live-streamed by a first user ⟋ 201 adding the preview information of the event to be live-streamed to a video posted by the first user ⟋ 202

FIG. 10

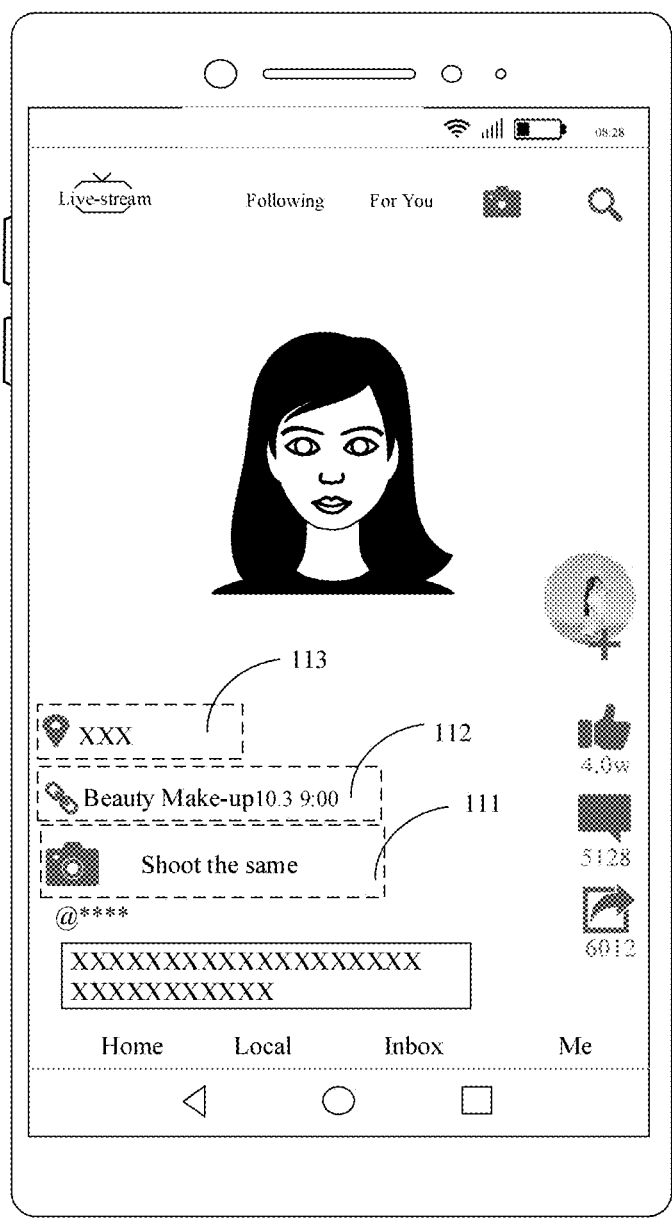

FIG. 11A

LIVE-STREAM PREVIEW METHOD, APPARATUS, ELECTRONIC DEVICE AND STORAGE MEDIUM

CROSS-REFERENCE TO RELATED APPLICATIONS

This application is a continuation of International Application No. PCT/CN2022/113867 filed on Aug. 22, 2022, which claims the priority to and benefits of the Chinese Patent Application No. 202111278254.6 filed on Oct. 30, 2021. All the aforementioned patent applications are hereby incorporated by reference in their entireties.

TECHNICAL FIELD

The present disclosure relates to the technical field of computer applications, and in particular to a live-stream preview method, apparatus, electronic device and storage medium.

BACKGROUND

With the continuous development and maturity of streaming media technology, there are more and more online live-stream platforms, and users can conduct product sales, science popularization and beauty make-up show, etc., through online live-stream. Before the live-stream, the anchor usually promotes the live-stream event to attract more users to watch the live-stream.

SUMMARY

The embodiment of the present disclosure provides a live-stream preview method, which comprises:

displaying an event promotion control on a page corresponding to a live-stream event created by a first user; and instructing, in response to a trigger operation on the event promotion control, a server to add preview information of the event to be live-streamed to a video posted by the first user.

The embodiment of the present disclosure provides a live-stream preview method, which comprises:

obtaining preview information of an event to be live-streamed sent by a client, in which the preview information of the event to be live-streamed is generated by the client after receiving a triggering operation on an event promotion control of the event to be live-streamed by a first user; and adding the preview information of the event to be live-streamed to a video posted by the first user.

The embodiment of the present disclosure provides a live-stream preview apparatus, which comprises:

a promotion control display module, configured to display an event promotion control on a page corresponding to a live-stream event created by a first user; and an instructing module, configured to instruct, in response to a trigger operation on the event promotion control, a server to add preview information of the event to be live-streamed to a video posted by the first user.

The embodiment of the present disclosure provides a live-stream preview apparatus, which comprises:

a preview information obtaining module, configured to obtain preview information of an event to be live-streamed sent by a client, in which the preview information of the event to be live-streamed is generated by the client after receiving a triggering operation on an event promotion control of the event to be live-streamed by a first user;

a preview information adding module, configured to add the preview information of the event to be live-streamed to a video posted by the first user.

The embodiment of the present disclosure provides an electronic device, which comprises: a processor; and a memory, configured to store executable instructions of the processor; the processor is configured to read the executable instructions from the memory and execute the instructions to realize the live-stream preview method provided by the embodiment of the present disclosure.

The embodiment of the present disclosure provides a computer-readable storage medium, a computer program is stored on the storage medium, and the computer program is configured to execute the live-stream preview method provided by the embodiment of the present disclosure.

The embodiment of the present disclosure provides a computer program product, which comprises computer program/instructions, the computer program/instructions, when executed by a processor, realize the live-stream preview method provided by the embodiment of the present disclosure.

BRIEF DESCRIPTION OF DRAWINGS

The above and other features, advantages, and aspects of the embodiments of the present disclosure will become more apparent in conjunction with the accompanying drawings and with reference to the following specific implementations. Throughout the drawings, identical or similar reference numbers refer to identical or similar elements. It should be understood that the drawings are schematic and components and elements are not necessarily drawn to scale.

FIG. 1 is a flowchart of a live-stream preview method provided by an embodiment of the present disclosure;

FIG. 2 is an example diagram of displaying an event promotion control in an associated region on a live-stream event page provided by an embodiment of the present disclosure;

FIG. 10 is a flowchart of a live-stream preview method provided by another embodiment of the present disclosure;

FIG. 11A is a first example diagram of showing a plurality of links in a video provided by an embodiment of the present disclosure;

DETAILED DESCRIPTION

Figure 3:
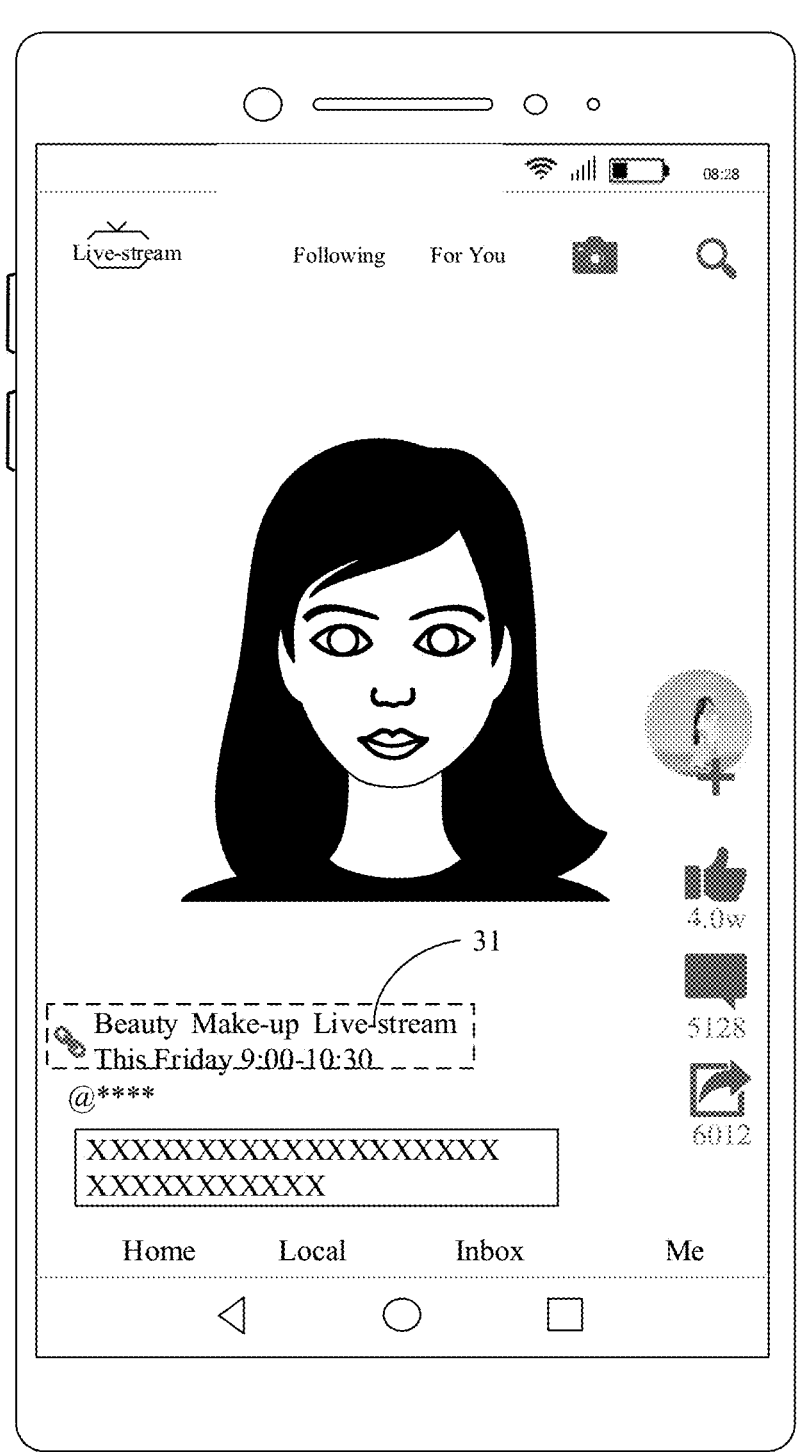
FIG. 3 is an example diagram of adding preview information of an event to be live-streamed in a previous video provided by an embodiment of the present disclosure.

Embodiments of the present disclosure will be described in more detail below with reference to the accompanying drawings. While certain embodiments of the present disclosure are shown in the drawings, it should be understood that the present disclosure can be implemented in various forms and should not be construed as being limited to the embodiments set forth herein, and on the contrary, these embodiments are provided for a more complete and thorough understanding of the present disclosure. It should be understood that the drawings and the embodiments of the present disclosure are for exemplary purposes only and are not intended to limit the protection scope of the present disclosure.

It should be understood that various steps recited in method implementations of the present disclosure can be performed in a different order, and/or performed in parallel. Furthermore, the method implementations can include additional steps and/or omit performing illustrated steps. The scope of the present disclosure is not limited in this respect.

The term "comprising" and variations thereof used herein are open-minded, i.e., "comprising but not limited to". The term "based on" is "based at least in part on". The term "one embodiment" means "at least one embodiment"; the term "another embodiment" means "at least one other embodiment"; and the term "some embodiments" means "at least some embodiments". Related definitions for other terms will be given in the following description.

It should be noted that concepts "first", "second", and the like mentioned in the present disclosure are only used for distinguishing different devices, modules or units, and are not used for limiting the order or interdependence of functions performed by the devices, modules, or units.

It should be noted that modifications of "one" or "a plurality of" mentioned in the present disclosure are intended to be illustrative rather than limiting, and that those skilled in the art should appreciate that they should be understood as "one or more" unless clearly indicated in the context otherwise.

At present, anchors mainly promote live-stream activities by recording videos. Specifically, after the anchor creates a live-stream event, he/she will orally promote his/her upcoming live-stream event when recording short videos later.

However, the live-stream event promotion method described above cannot guarantee the promotion effect of the live-stream event.

FIG. 1 is a flowchart of a live-stream event preview method provided by an embodiment of the present disclosure. The method can be executed by a live-stream preview apparatus, wherein the apparatus can be implemented by software and/or hardware and can generally be integrated into an electronic device. The electronic device can be a client device held by an anchor (the first user in the following embodiments) who needs to promote a live-stream event, and the client device includes but is not limited to a smart phone, a tablet computer, a wearable device or the like, with live-stream software installed thereon. As shown in FIG. 1, the live-stream preview method can include the following steps:

Step 101: displaying an event promotion control on a page corresponding to a live-stream event created by a first user.

The first user refers to an anchor who is currently creating an event to be live-streamed, and any user on the live-stream software can be the first user. The page corresponding to the live-stream event refers to a page related to the live-stream event, which can be a live-stream event page generated after the current newly-created live-stream event has been created, or any other page including the created live-stream event, such as a live-stream event list page, and so on. The present embodiment is illustrated below by taking displaying the event promotion control on the live-stream event page as an example.

In the embodiment of the present disclosure, when the first user wants to perform live-stream, he/she can enter an event creating page through a live-stream event creating entry provided by the live-stream software, so as to set relevant information of the live-stream event, such as the name of the live-stream event, live-stream time and introduction information of the live-stream event, etc. The client generates a live-stream event page according to the relevant information set by the first user, and the live-stream event page can include the name of the live-stream event, live-stream time, the introduction information of the live-stream event, and the anchor of the live-stream event, etc. An event promotion control is displayed in the associated region of the live-stream event page, and the event promotion control is used for users to enable the live-stream event promotion function. When the user activates the event promotion control, it indicates that the user agrees to promote the currently created live-stream event.

The associated region on the live-stream event page can be a preset region on the live-stream event page, such as the bottom of the live-stream event page, and can also be a pop-up window region popped up on the live-stream event page, which is not limited in the present disclosure.

Illustratively, FIG. 2 is an example diagram of displaying an event promotion control in an associated region on a live-stream event page provided by an embodiment of the present disclosure. As shown in FIG. 2, an event promotion control 21 is displayed at the bottom of the live-stream event page, and the state of the event promotion control 21 is deactivated by default (as shown in FIG. 2, when the circle is on the left, it is in a deactivated state), and a prompt message of "Enable this function to promote the live-stream event created this time" is displayed below the event promotion control 21 to remind the first user of the function of the event promotion control 21. It can be understood that FIG. 2 is only used as an example to explain the present disclosure, but not as a limitation to the present disclosure.

Step 102: in response to a trigger operation on the event promotion control, switching a display state of the event promotion control on the page corresponding to the live-stream event to add preview (or forecast) information of the event to be live-streamed to a video posted by the first user.

The video posted by the first user can be all the videos posted by the first user in the past, can also be some of the videos posted in the past with the number of views, sharing times, likes, etc., reaching a threshold, and can also be a video designated by the first user to promote the live-stream event, and so on, which is not limited in the present disclosure.

In the embodiment of the present disclosure, when the first user activates the event promotion control displayed on the page corresponding to the live-stream event, the client, in response to the trigger operation on the event promotion control, instructs the server to add preview information of the event to be live-streamed to a video posted by the first user, i.e., associating preview information of the event to be live-streamed with the video. Further, when the server obtains the preview information of the event to be live-streamed, it adds the preview information of the event to be live-streamed to a video posted by the first user.

The preview information of the event to be live-streamed can be but not limited to an event link corresponding to the event to be live-streamed, a preview keyword of the event to be live-streamed, and a combination of the event link and the preview keyword of the event to be live-streamed, which is not limited in the present disclosure.

Illustratively, assuming that the first user activates the event promotion control 21 shown in FIG. 2, the server adds the preview information corresponding to the event to be live-streamed in the previous video of the first user, so as to recommend the event to be live-streamed. FIG. 3 is an example diagram of adding preview information of an event to be live-streamed in a previous video provided by an embodiment of the present disclosure. As shown in FIG. 3, the video was posted 10 days ago, and the preview information 31 of the event to be live-streamed is displayed above the publisher of the video. The preview information 31 is a link and carries the preview keywords of "Beauty Make-up Live-stream" and "9:00-10:30, this Friday", so that other users can know relevant information about the live-stream event according to the preview keywords. It can be understood that FIG. 3 is only used as an example to explain the present disclosure, but not as a limitation to the present disclosure.

In the live-stream preview method according to the embodiment of the present disclosure, the event promotion control is displayed on the page corresponding to the live-stream event created by the first user, and in response to the trigger operation on the event promotion control, the server is instructed to add the preview information of the event to be live-streamed to a video posted by the first user, so that the server can add the preview information of the event to be live-streamed to a video posted by the first user. By adopting the above technical solution, the user can promote the preview information of a video to be live-streamed in the video posted by the user by triggering the event promotion control, thus realizing the one-click promotion of the event to be live-streamed, and improving the convenience for the user to promote the live-stream event; moreover, by promoting the event to be live-streamed in the videos posted by the user, the user's live-stream event can be promoted by using the popularity of the user's previous videos, which is beneficial to improving the distribution efficiency of the live-stream event preview and improving the promotion effect of the live-stream event.

In some implementations of the present disclosure, the displaying the event promotion control on the page corresponding to the live-stream event created by the first user includes:

displaying, in response to the first user's completing operation of a current newly-created live-stream event, guidance information for determining whether to add an event promotion function;

displaying, in response to an adding operation of the event promotion function in the guidance information, a first event promotion control in a first preset region on the live-stream event page, wherein the first event promotion control is used to instruct the server whether to enable a promotion function for the current newly-created live-stream event, and the current newly-created live-stream event is a live-stream event that has been currently newly created and displayed on the live-stream event page.

The guidance information can be guidance information that guides the user to add the live-stream event promotion function, and the guidance information can be shown in the form of a pop-up window page.

In the embodiment of the present disclosure, when it is detected that the first user has finished creating the current newly-created live-stream event, for example, when the first user clicks on the "Create" button on the event creating page, or when the calendar pop-up window is closed after the first user finishes setting the live-stream time, or in other scenes, the client confirms that the first user has finished creating the current newly-created live-stream event, and then display, in response to the first user's completing operation of the current newly-created live-stream event, guidance information for determining whether to add an event promotion function through a pop-up window page on the current newly-created live-stream event page, and the pop-up window page is displayed on an upper layer of the current newly-created live-stream event page. If the first user confirms to add the event promotion function, the first event promotion control is displayed in the first preset region on the current newly-created live-stream event page in response to the adding operation of the event promotion function in the pop-up window page by the first user.

The first preset region can be automatically configured by the live-stream software, and for example, the first preset region can be the bottom of the newly-created live-stream event page.

In the embodiment of the present disclosure, the first event promotion control is used to instruct whether to enable a promotion function for the current newly-created live-stream event. When the first user activates the first event promotion control, it means that the first user agrees to promote the current newly-created live-stream event, and the preview information of the current newly-created live-stream event is added in the previous video posted by the first user.

Figure 4A:
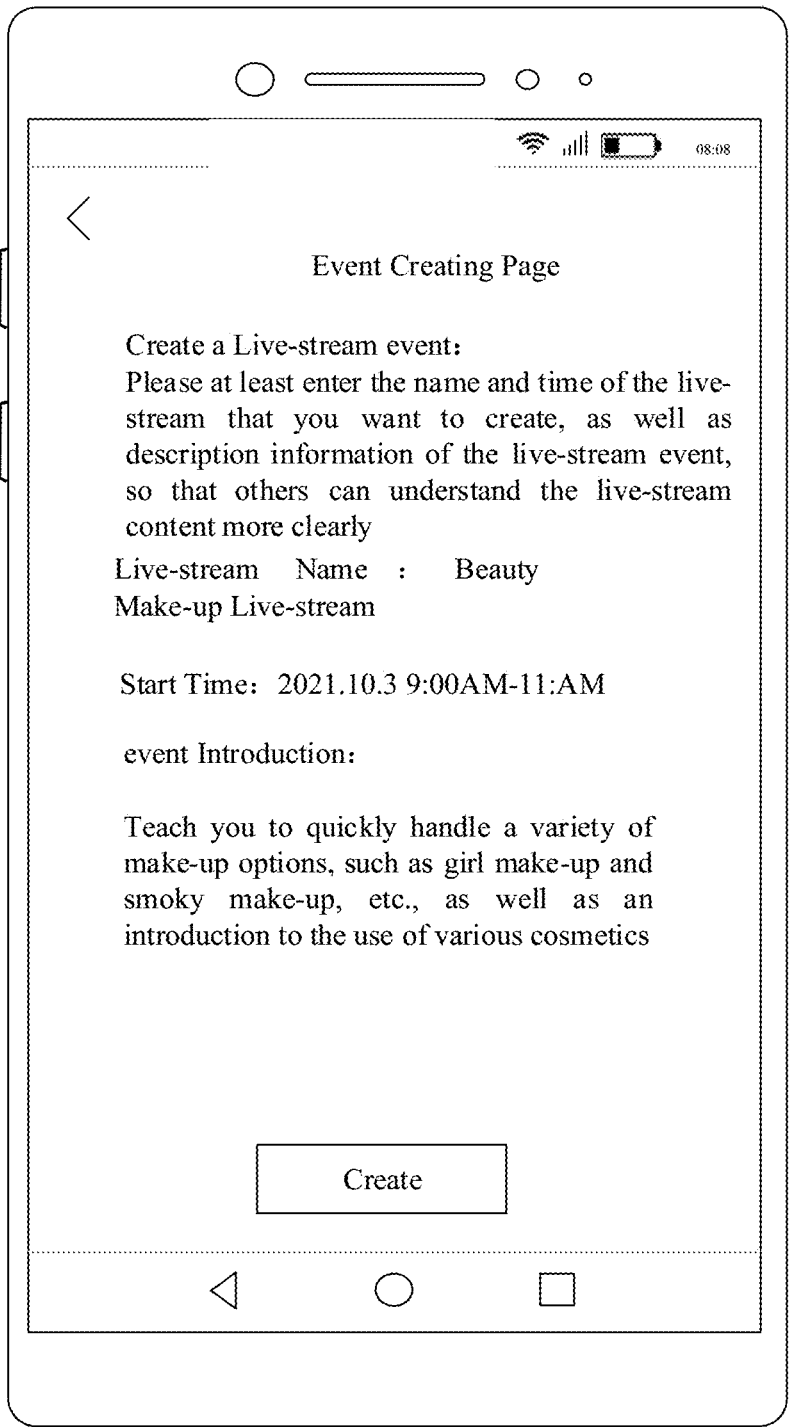
FIG. 4A is an example diagram of an event creating page provided by an embodiment of the present disclosure.
Figure 4B:
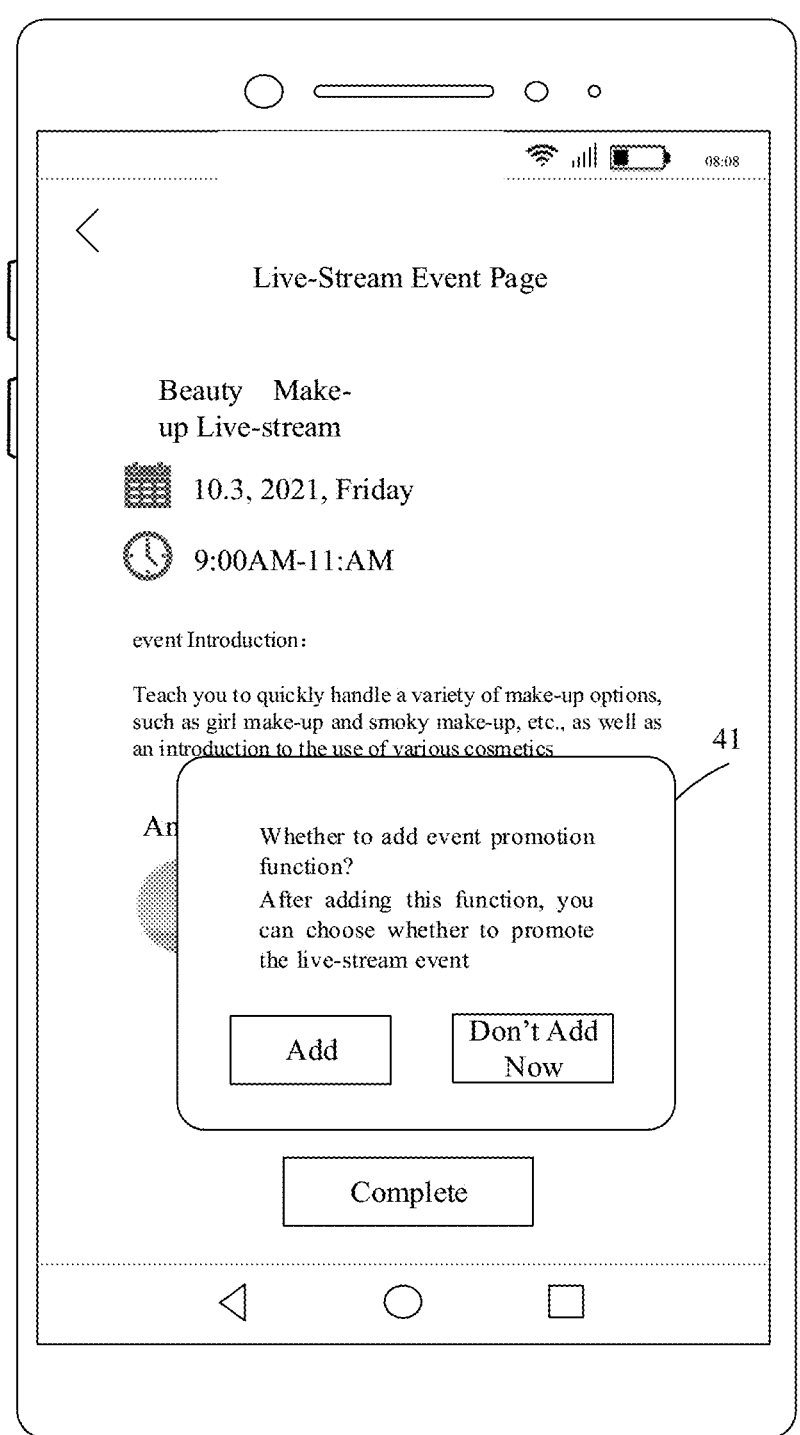
FIG. 4B is an example diagram of a live-stream event page provided by an embodiment of the present disclosure.
Figure 4C:
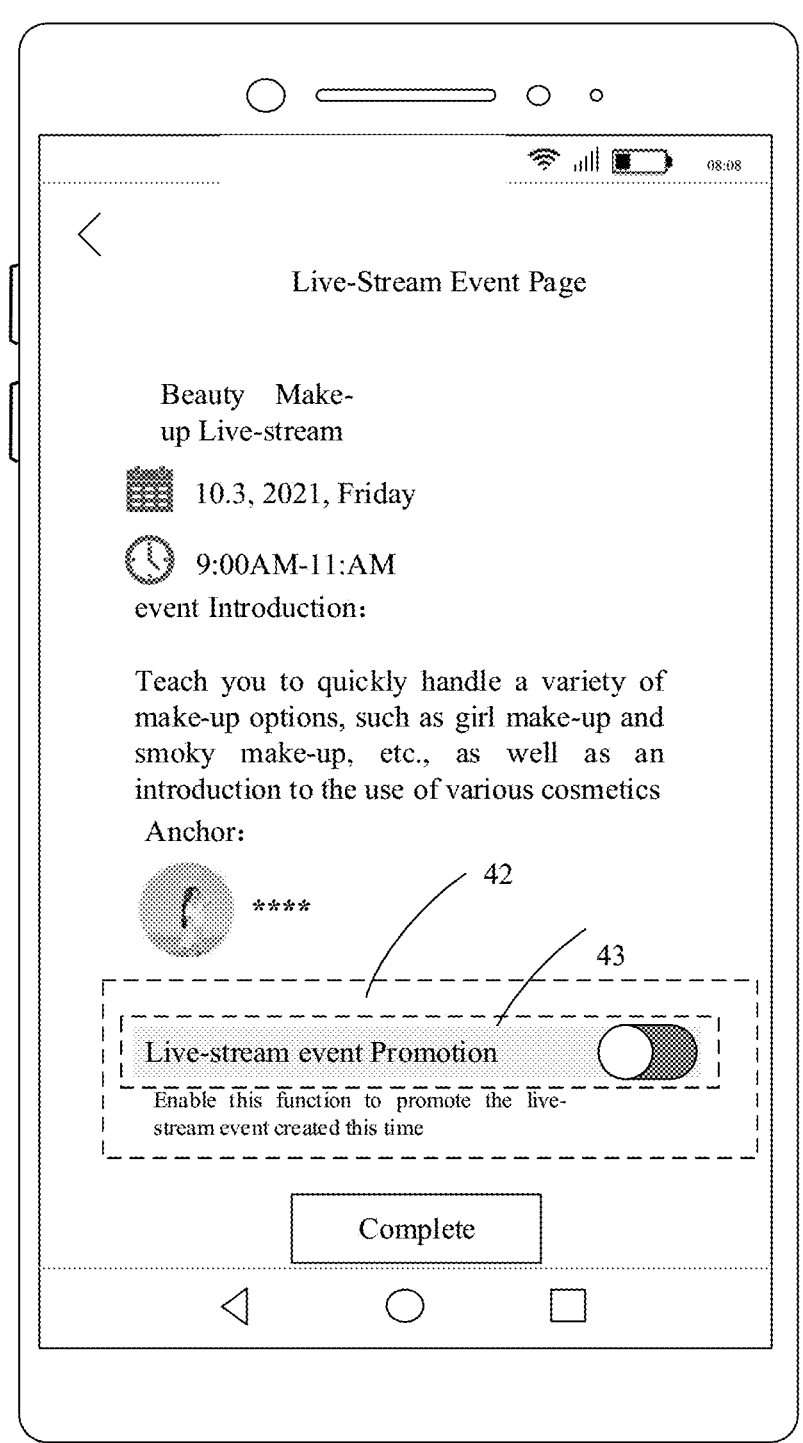
FIG. 4C is an example diagram of displaying a first event promotion control in a preset region on a live-stream event page provided by an embodiment of the present disclosure.

Illustratively, FIG. 4A is an example diagram of an event creating page provided by an embodiment of the present disclosure. It can be understood that FIG. 4A is only used as an example to explain the content of the present disclosure, but not as a limitation to the present disclosure. As shown in FIG. 4A, the first user, after filling in the relevant information such as the live-stream name, live-stream time and live-stream event introduction information, etc., of the current newly-created live-stream event on the event creating page, can click on the "Create" button at the bottom of the page, so as to finish creating the current newly-created live-stream event. In response to the clicking operation on the "Create" button, the page jumps to the live-stream event page corresponding to the current newly-created live-stream event as shown in FIG. 4B, and a pop-up window page 41 will automatically pop up on the live-stream event page. The pop-up window page 41 displays guidance information for determining whether to add the event promotion function, and is provided with an "Add" button and a "Don't Add Now" button for the first user to select. If the first user clicks on the "Add" button, the first event promotion control 43 is displayed in the first preset region 42 of the current newly-created live-stream event page in response to the first user's clicking operation on the "Add" button. As shown in FIG. 4C, the default state of the first event promotion control 43 is deactivated (the circle is on the left), and a prompt message of "Enable this function to promote the live-stream event created this time" is displayed below the first event promotion control 43. The first user, when prompted by the prompt message, can choose to activate the first event promotion control 43 or not to activate the first event promotion control 43 according to the first user's needs.

In the embodiment of the present disclosure, after finishing creating the current newly-created live-stream event, the guidance information for determining whether to add the event promotion function is displayed, and then whether to display the first event promotion control is determined according to the user's selecting operation. When the first user selects to add the event promotion function, the first event promotion control is displayed in the first preset region on the live-stream event page corresponding to the current newly-created live-stream event, so that the corresponding event promotion control can be displayed only when the user has the live-stream event promotion demand, and the event promotion control is not displayed when the user has no promotion demand. The display of the event promotion control matches the user's needs and the flexibility is strong.

Further, in some implementations of the present disclosure, when the first user does not want to promote this newly-created live-stream event for the time being, he/she can choose not to add the event promotion function on the displayed page for determining whether to add the event promotion function. Thus, the method further includes:

detecting, in response to a rejecting operation of the event promotion function on the page, whether a cumulative number of rejecting operations reaches a preset threshold;

if the cumulative number reaches the preset threshold, not displaying the guidance information for determining whether to add an event promotion function for a subsequent newly-created live-stream event.

The threshold can be automatically configured by the live-stream software. For example, the threshold can be 2, 5, etc., which is not limited in the present disclosure.

Still taking FIG. 4B as an example, as shown in FIG. 4B, the pop-up window page 41 is provided with an "Add" button and a "Don't Add Now" button for the first user to select. If the first user does not want to promote the current newly-created live-stream event for the time being, he/she can click on the "Don't Add Now" button, and in response to the first user's clicking operation on the "Don't Add Now" button (that is, rejecting operation of the event promotion function), the cumulative number of rejecting operations is increased by 1. And it is detected whether the current cumulative number of rejecting operations reaches a preset threshold, and if the cumulative number reaches the threshold, the page for determining whether to add an event promotion function is not displayed for a subsequent newly-created live-stream event.

In the embodiment of the present disclosure, when the first user rejects the event promotion function, the number of rejecting operations are accumulated, and when the accumulated number of rejecting operations reach the preset threshold, the page for determining whether to add the event promotion function is no longer displayed for the first user's subsequent newly-created live-stream event, so that the first user is not repeatedly inquired whether to add the event promotion function when the first user has no promotion demand for a newly-created live-stream event, thus avoiding the disturbance caused by repeated inquiries to the user and being helpful to improve the user experience.

In some implementations of the present disclosure, after the displaying, in response to the adding operation of the event promotion function in the guidance information, the first event promotion control in the first preset region on the live-stream event page, the method further includes:

displaying a second event promotion control in a second preset region on the live-stream event page, wherein the second event promotion control is used to instruct the server whether to enable a promotion function for a subsequent newly-created live-stream event.

The second preset region can be set below the first preset region, or can be set in the first preset region, which is not limited in the present disclosure.

Figure 5:
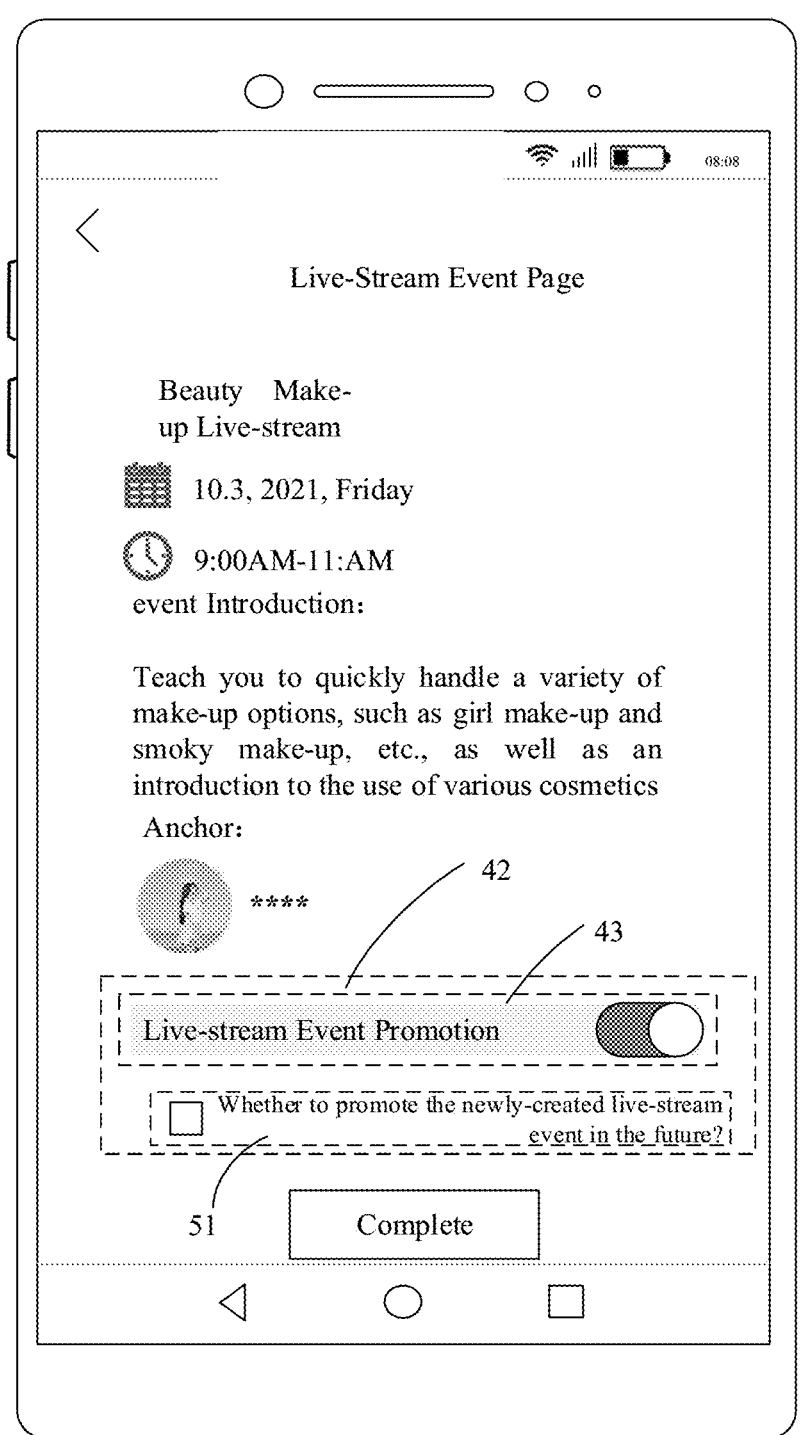
FIG. 5 is an example diagram of displaying a second event promotion control on a live-stream event page provided by an embodiment of the present disclosure.

Illustratively, the second event promotion control may be displayed after the first event promotion control is activated. As shown in FIG. 4C, the first event promotion control 43 is in a deactivated state, and the second event promotion control is not displayed in the first preset region 42 at this time. When the first user activates the first event promotion control, the second event promotion control 51 is displayed in the first preset region 42, as shown in FIG. 5. FIG. 5 is an example diagram of displaying a second event promotion control on a live-stream event page provided by an embodiment of the present disclosure. It can be understood that FIG. 5 is only used as an example to explain the content of the present disclosure, but not as a limitation to the present disclosure. As shown in FIG. 5, the state of the first event promotion control 43 is activated (the circle is on the right); at this time, the second event promotion control 51 is displayed in the second preset region, and the second preset region is set in the first preset region 42. The second event promotion control 51 includes control description information of "Whether to promote the newly-created live-stream event in the future?", and a check box of the control description information. The second event promotion control 51 is in an unchecked state by default, which is as shown in FIG. 5. When the first user needs to promote all the newly-created live-stream activities in the future, the first user can enable the promotion function for subsequent newly-created live-stream activities in the future. At this time, "√" can be displayed in the check box to indicate being checked. Because the first user has activated the first event promotion control 43 at this time, there is no need to continue to display the prompt message of "Enable this function to promote the live-stream event created this time". By comparing FIG. 4C and FIG. 5, it can be seen that the position where the above prompt message was originally displayed is occupied by the second event promotion control 51.

Figure 6:
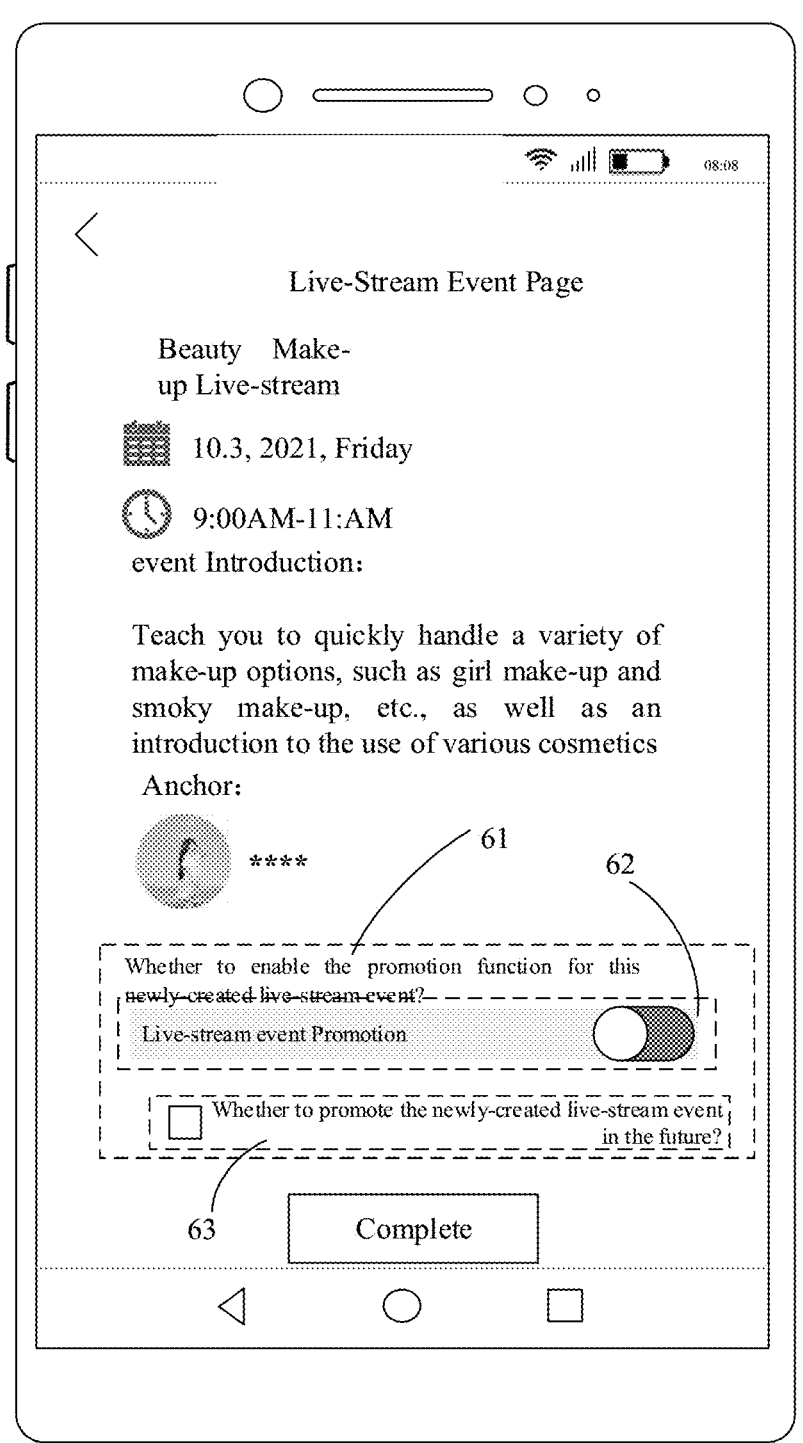
FIG. 6 is an example diagram of displaying a second event promotion control on a live-stream event page provided by another embodiment of the present disclosure.

Illustratively, the second event promotion control can be displayed simultaneously with the first event promotion control, that is, the first event promotion control and the second event promotion control are displayed simultaneously in the preset region of the current newly-created live-stream event page in response to the adding operation of the event promotion function in the pop-up window page. FIG. 6 is an example diagram of displaying a second event promotion control on a live-stream event page provided by another embodiment of the present disclosure. It can be understood that FIG. 6 is only used as an example to explain the content of the present disclosure, but not as a limitation to the present disclosure. As shown in FIG. 6, in response to the adding operation of the event promotion function in the pop-up window page by the first user, the first event promotion control 62 and the second event promotion control 63 are simultaneously displayed in the preset region 61 of the live-stream event page corresponding to the current newly-created live-stream event. The state of the first event promotion control 62 is deactivated (the circle is on the left), and the default state of the second event promotion control 63 is unchecked. Moreover, as shown in FIG. 6, a prompt message of "Whether to enable the promotion function for this newly-created live-stream event" is displayed above the first event promotion control 62 to remind the first user of the function of the first event promotion control 62.

In some implementations of the present disclosure, the method further includes: in response to a triggering operation on the second event promotion control, not displaying guidance information for determining whether to add an event promotion function for a subsequent newly-created live-stream event.

In the embodiment of the present disclosure, when the first user wants to activates the second event promotion control, a triggering operation, such as a checking operation, can be performed on the second event promotion control; and in response to the triggering operation, when the first user newly creates a live-stream event in the future, guidance information for determining whether to add an event promotion function is no longer displayed for the subsequent newly-created live-stream event.

In the embodiment of the present disclosure, the second event promotion control for instructing whether to enable the promotion function for the subsequent newly-created live-stream event is displayed in the preset region on the current newly-created live-stream event page, so that the first user can choose whether to enable the promotion function for the subsequent newly-created live-stream event according to his/her own needs, and the flexibility is strong. Moreover, when the first user chooses to enable the promotion function for the subsequent newly-created live-stream event, the guidance information for determining whether to add the event promotion function is not displayed for the subsequent newly-created live-stream event in response to the triggering operation on the second event promotion control; in this way, it can avoid displaying a page for determining whether to add the event promotion function for each newly-created live-stream event of the first user, so that the first user, after finishing creating the subsequent newly-created live-stream event, can promote the live-stream event in the previous video of the first user; and it is not necessary to inquire the first user again whether to add the event promotion function, and it is not necessary for the first user to activate the first event promotion control again, thus saving the promotion process of the subsequent newly-created live-stream event.

The live-stream platform can further provide a live-stream event list. When the first user creates many live-stream activities or has many live-stream activities that have not been started, the live-stream activities that have not been started can be displayed in the live-stream event list, and the first user can also select the live-stream event that need to be promoted through the live-stream event list. Thus, in some implementations of the present disclosure, the displaying the event promotion control in the associated region on the live-stream event page created by the first user can include:

displaying, in response to a viewing operation on a live-stream event list, a live-stream event list page created by the first user, wherein a first entry identifier is set on the live-stream event list page;

displaying, in response to a triggering operation on the first entry identifier, a third event promotion control in a third preset region on the live-stream event list page, wherein the third event promotion control is used to instruct the server whether to enable a promotion function for a subsequent newly-created live-stream event.

The third preset region on the live-stream event list page can be automatically configured by the live-stream software, and the third preset region on the live-stream event list page can be a certain blank region on the live-stream event list page, or a pop-up window region displayed on the upper layer of the live-stream event list page, or a new page displayed on the upper layer of the live-stream event list page, and so on, which is not limited in the present disclosure.

Figure 7A:
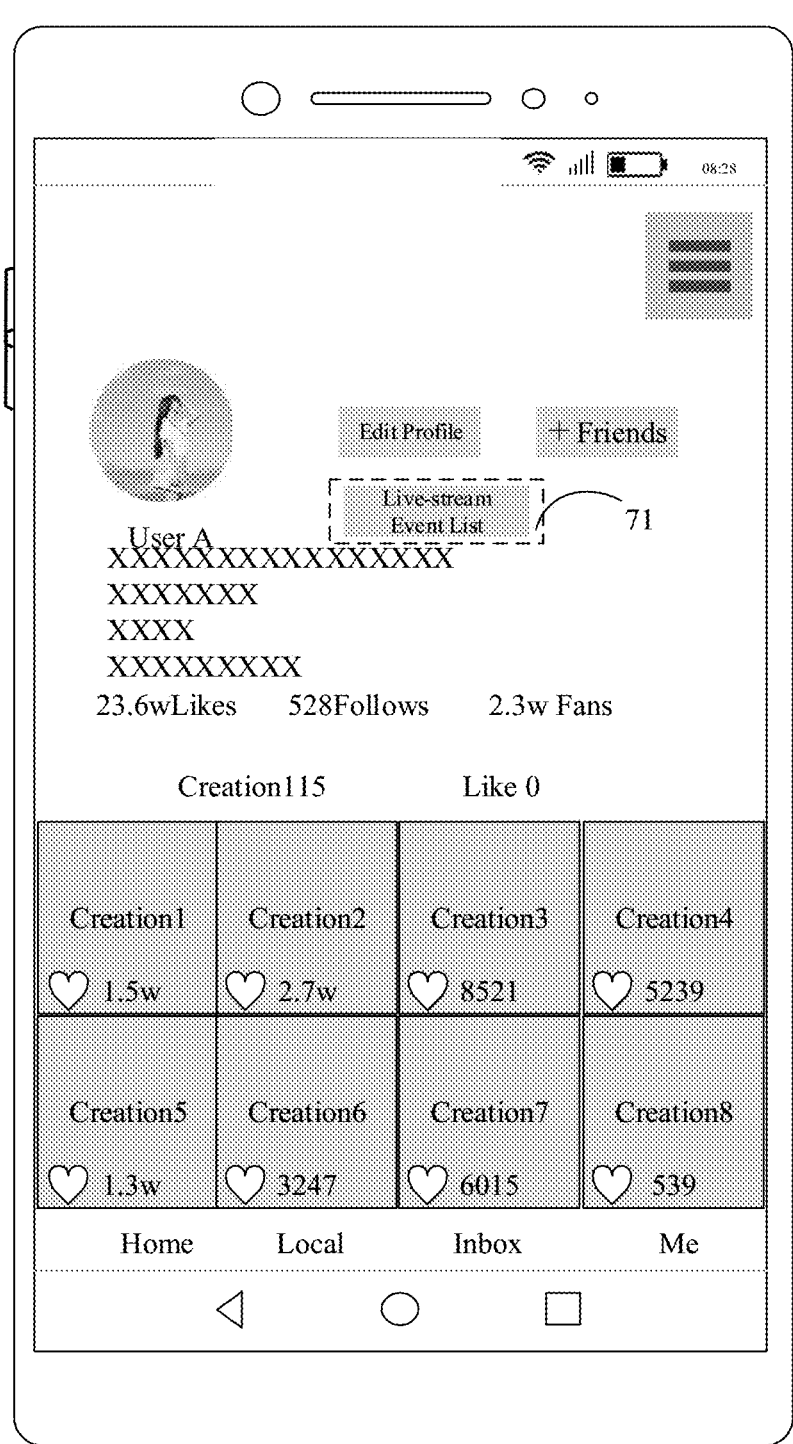
FIG. 7A is an example diagram of a personal homepage of a first user provided by an embodiment of the present disclosure.
Figure 7B:
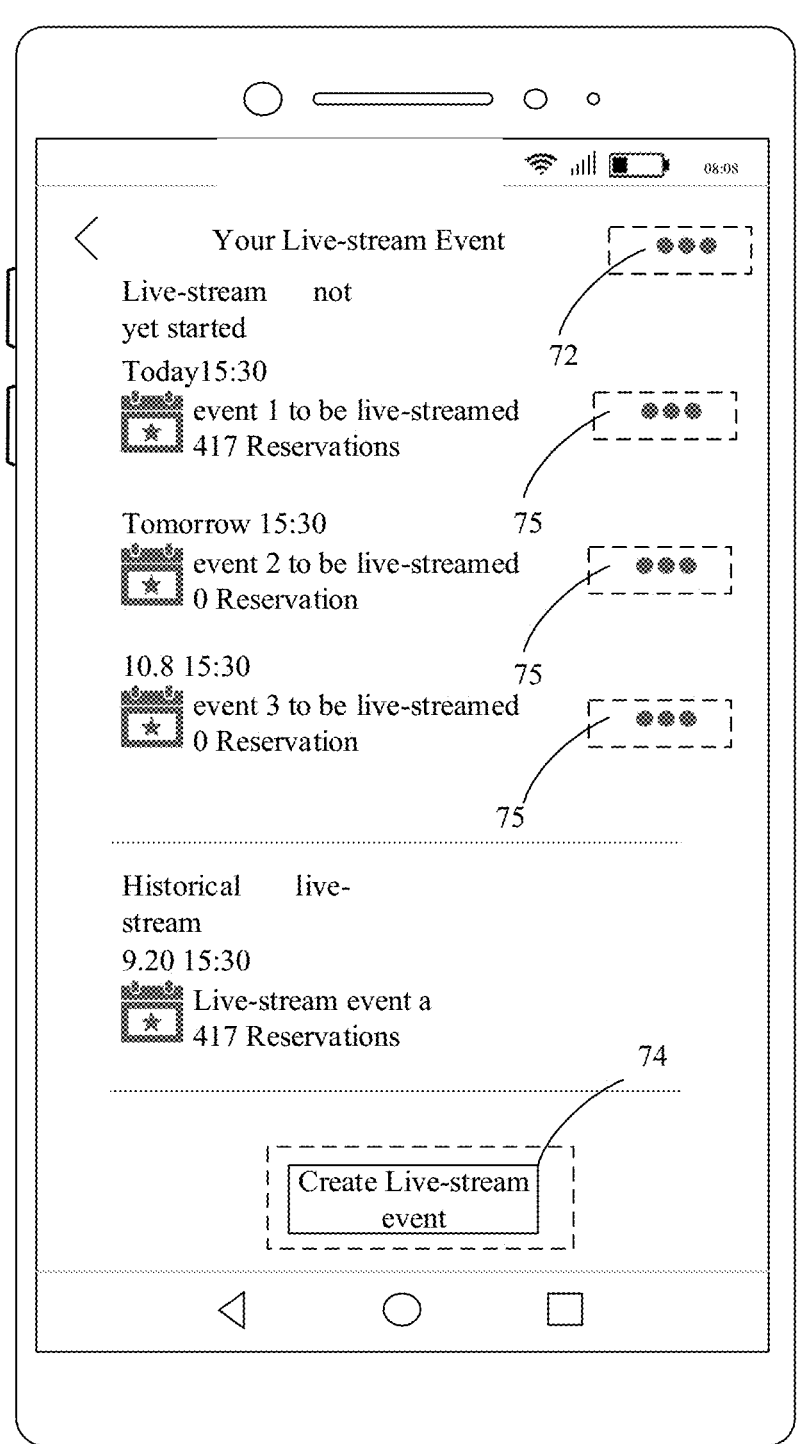
FIG. 7B is an example of a live-stream event list page provided by an embodiment of the present disclosure.
Figure 7C:
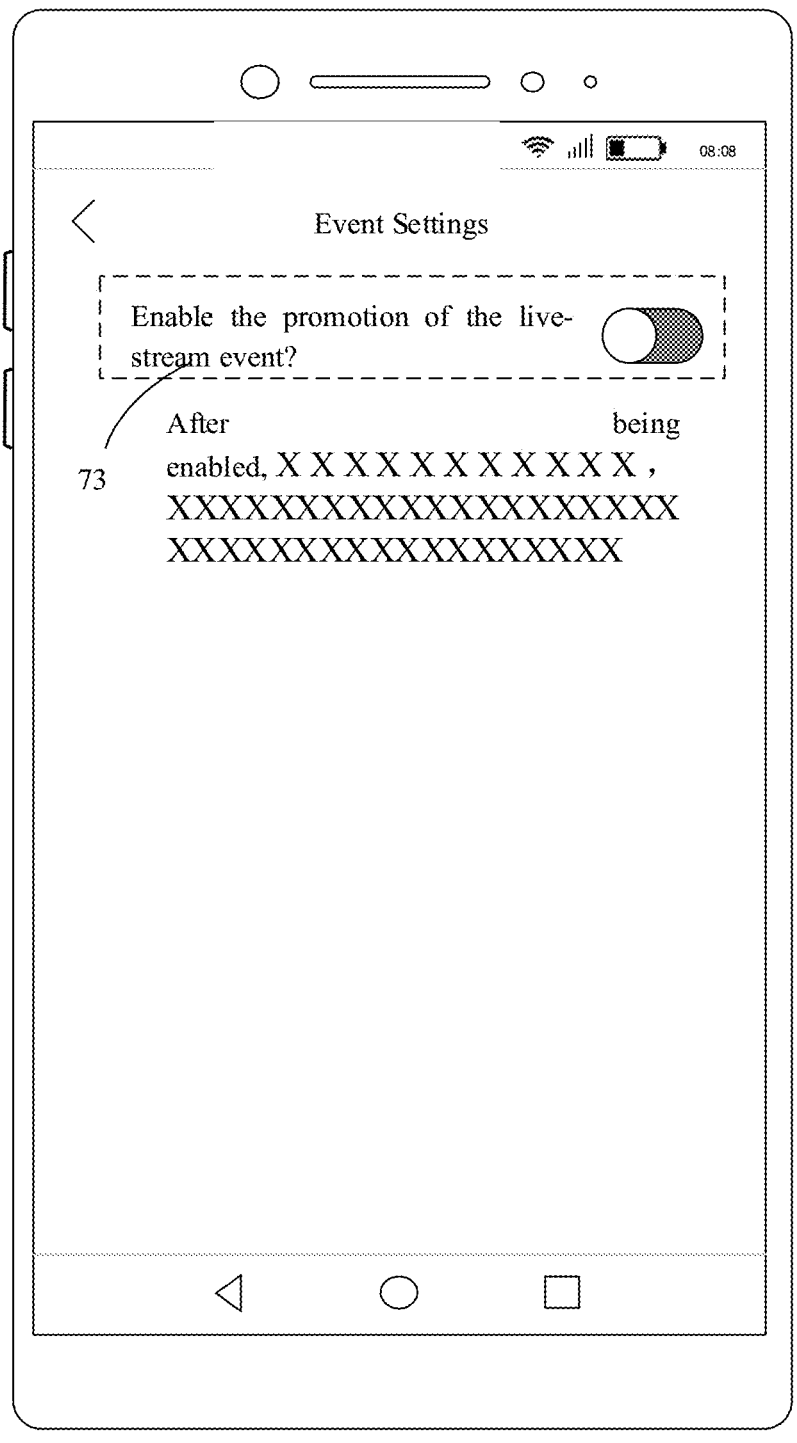
FIG. 7C is an example of a display interface of a third event promotion control provided by an embodiment of the present disclosure.

For example, a viewing entry of the live-stream event list can be displayed on the personal homepage of the first user in the live-stream platform. As shown in FIG. 7A, the first user is user A, and a viewing entry 71 of the live-stream event list is displayed on the personal homepage of user A. When user A clicks on the viewing entry 71 of the live-stream event list, the live-stream event list page created by user A is displayed in response to the triggering operation on the viewing entry 71 of the live-stream event list. As shown in FIG. 7B, a first entry identifier 72 is set on the live-stream event list page. The first entry identifier is represented by " . . . " in FIG. 7B, and can also be represented by other symbols or icons. FIG. 7B is only an example and cannot be regarded as a limitation to the present disclosure. When user A clicks on the first entry identifier 72, a third event promotion control 73 is displayed in the third preset region on the live-stream event list page (a new page on the upper layer of the live-stream event list page) in response to the triggering operation of user A on the first entry identifier 72, as shown in FIG. 7C. As can be seen from FIG. 7C, the third event promotion control 73 includes control description information of "Enable the promotion of the live-stream event?" and a control switch, and the control switch is in a deactivated state by default (the circle is on the left). User A can choose whether to activate the control switch of the third event promotion control 73 according to his/her own needs. If user A activates the control switch, all live-stream activities newly created by user A in the future will be promoted. As shown in FIG. 7B, the live-stream event list page also displays an entry 74 of "Create Live-stream Event". When user A clicks on the entry 74, the page jumps to the event creating page for user A to create a new live-stream event.

In other embodiments of the present disclosure, the third event promotion control can also be used to instruct the server whether to enable a promotion function for the live-stream event that have been created but not yet started, as well as the subsequent newly-created live-stream event. Thus, in the above example, if the user A activates the control switch of the third event promotion control 73, the live-stream activities newly created by user A and the live-stream activities that have been created but not yet started will all be promoted.

In the embodiment of the present disclosure, a live-stream event list page created by the first user is displayed in response to a viewing operation on the live-stream event list, and a first entry identifier is set on the live-stream event list page; a third event promotion control is displayed in a third preset region on the live-stream event list page in response to a triggering operation on the first entry identifier, and the third event promotion control is used to instruct the server whether to enable a promotion function for a subsequent newly-created live-stream event, thus providing an entry for the user to enable the promotion function for the subsequent newly-created live-stream event. The user can enable the promotion function for the subsequent newly-created live-stream event at any time through the first entry identifier, so that there is no need to create a new live-stream event, the flexibility is strong, and the convenience for the user to enable the promotion function for the subsequent newly-created live-stream event is also improved.

Further, in some implementations of the present disclosure, the live-stream event list page further includes information of a plurality of activities to be live-streamed, wherein information of each event to be live-streamed is correspondingly provided with a second entry identifier, and the method further includes:

displaying, in response to a triggering operation on the second entry identifier corresponding to information of any event to be live-streamed, a fourth event promotion control corresponding to the information of the event to be live-streamed in a fourth preset region on the live-stream event list page, wherein the fourth event promotion control is used to instruct the server whether to enable a promotion function for the information of the any event to be live-streamed.

Figure 7D:
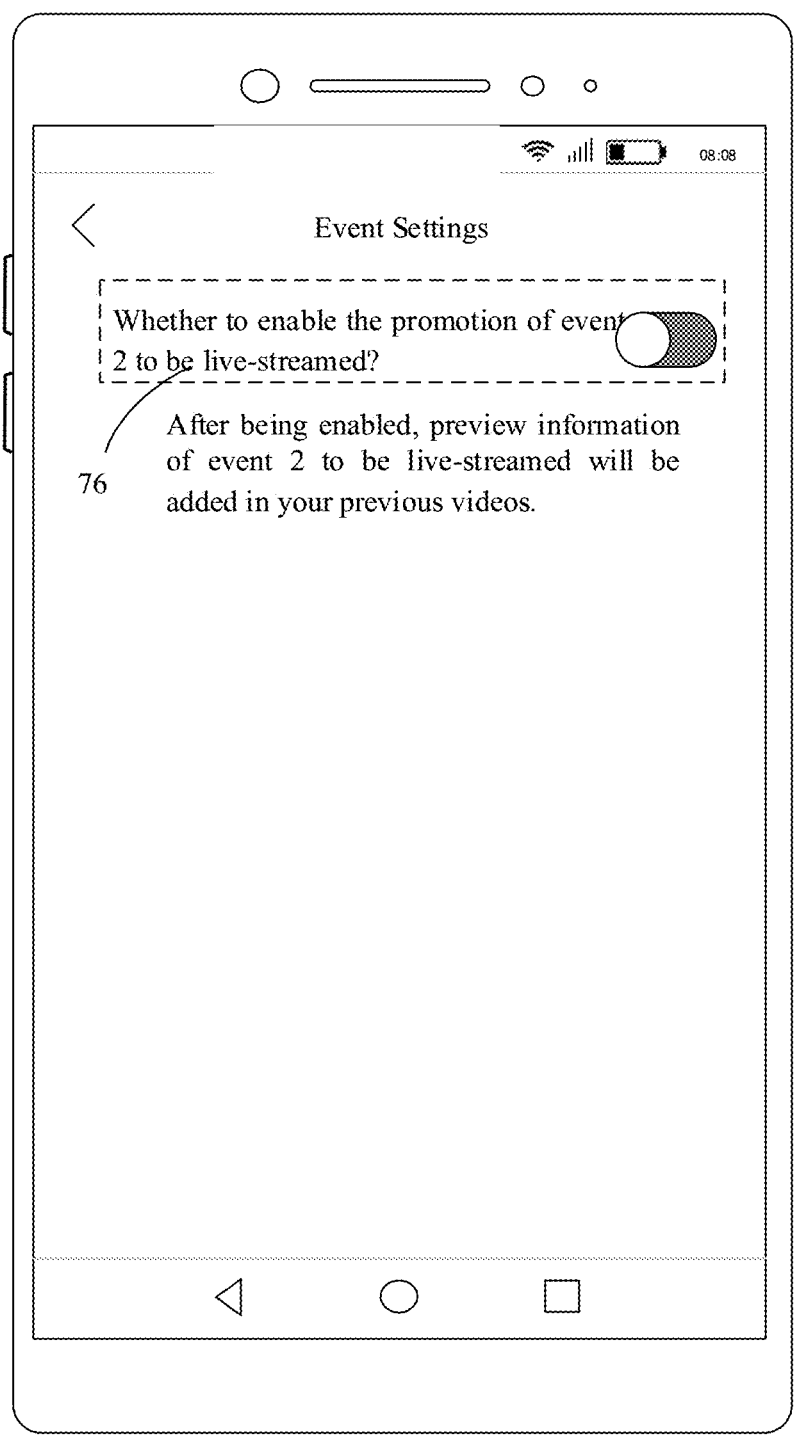
FIG. 7D is an example of a display interface of a fourth event promotion control provided by an embodiment of the present disclosure.

Illustratively, as shown in FIG. 7B, the event 1 to be live-streamed, event 2 to be live-streamed and event 3 to be live-streamed, which have not yet been started, are displayed on the live-stream event list page. Corresponding to the event information of each live-stream event, a corresponding second entry identifier 75 is displayed, and the second entry identifier is represented by " . . . ". Assuming that user A clicks on the second entry identifier 75 corresponding to the event 2 to be live-streamed, in response to the triggering operation of user A on the second entry identifier 75 corresponding to the event 2 to be live-streamed, a fourth event promotion control 76 corresponding to the event information of the event 2 to be live-streamed is displayed in a fourth preset region on the live-stream event list page (a new page on the upper layer of the live-stream event list page). As shown in FIG. 7D, the fourth event promotion control 76 includes control description information of "Whether to enable the promotion of event 2 to be live-streamed?" and a control switch, and the default state of the control switch is deactivated (the circle is on the left). If user A activates the control switch of the fourth event promotion control 76, the event 2 to be live-streamed is promoted.

In the embodiment of the present disclosure, the live-stream event list page includes information of a plurality of activities to be live-streamed, information of each event to be live-streamed is correspondingly provided with a second entry identifier; in response to a triggering operation on the second entry identifier corresponding to information of any event to be live-streamed, a fourth event promotion control corresponding to the information of the event to be live-streamed is displayed in a fourth preset region on the live-stream event list page, and the fourth event promotion control is used to instruct the server whether to enable a promotion function for the information of the any event to be live-streamed, so that the first user can select the live-stream event needing to be promoted on the live-stream event list page for promotion, and the first user can enable the promotion function for the event to be live-streamed at any time, and the flexibility is strong.

In some implementations of the present disclosure, the method further includes: displaying, for an event to be live-streamed with an activated event promotion control, a promotion identifier in a title region of the event to be live-streamed on the live-stream event list page.

Figure 7E:
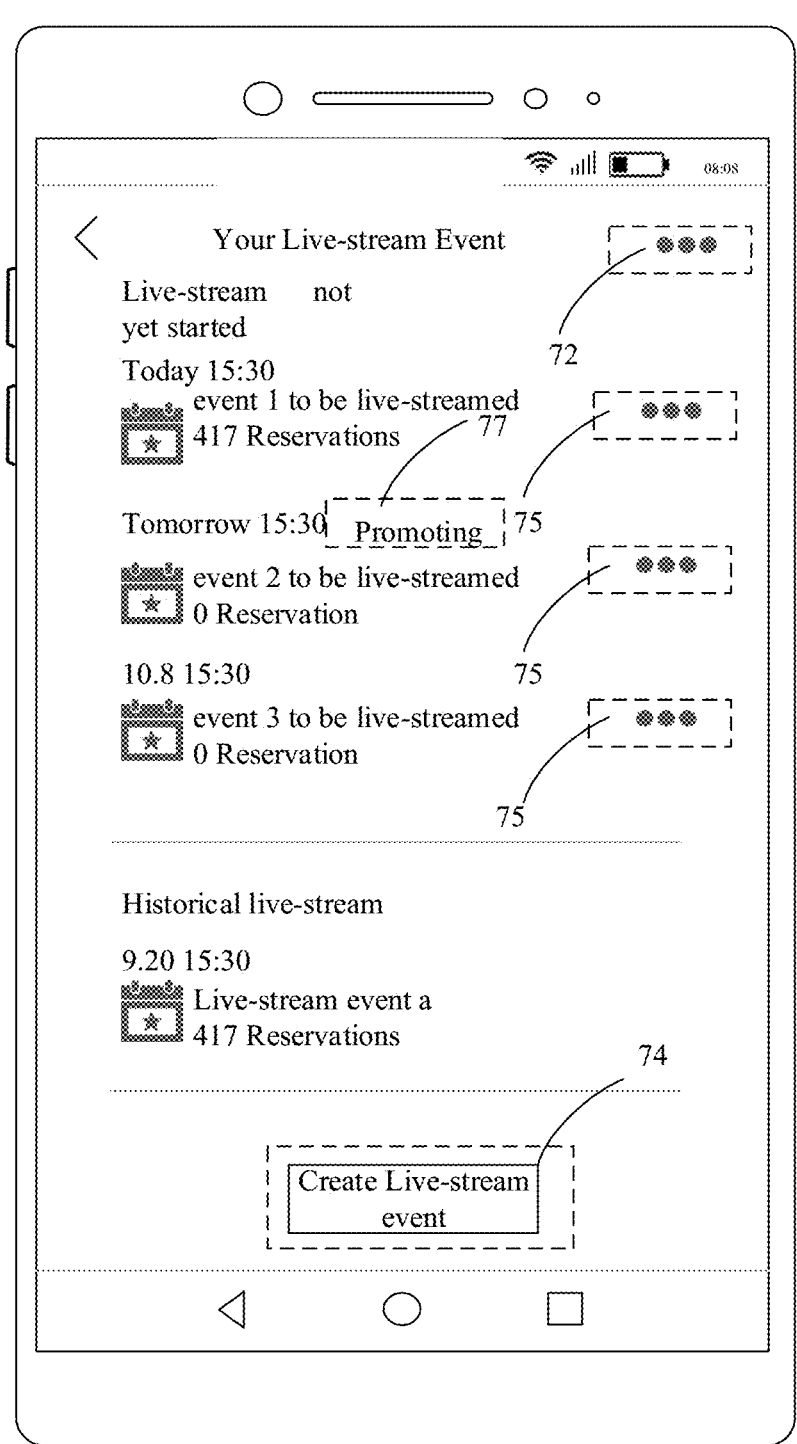
FIG. 7E is an example diagram of adding a promotion identifier to a promoted event to be live-streamed provided by an embodiment of the present disclosure.

Continuing with the above example, user A selects to activate the control switch of the fourth event promotion control 76 in FIG. 7D, and then a promotion identifier is displayed in the title region of the event 2 to be live-streamed on the live-stream event list page, such as the promotion identifier 77 shown in FIG. 7E. By displaying the promotion identifier in the title region of the event to be live-streamed, the first user can know the live-stream event that is being promoted. It can be understood that the cancelled live-stream event can be deleted from the live-stream event list page, and the completed live-stream can be deleted from the live-stream event list page or displayed behind the live-stream event that has not been started on the live-stream event list page, which is not limited in the present disclosure.

In some implementations of the present disclosure, the instructing, in response to the trigger operation on the event promotion control, the server to add the preview information of the event to be live-streamed to a video posted by the first user includes:

obtaining a video show scene set by the first user;

instructing, in response to the trigger operation on the event promotion control, the server to add the preview information of the event to be live-streamed in a first target video, wherein the first target video is a video satisfying the video show scene.

The video show scene can include, but is not limited to, at least one of the following: a video of a type or theme designated by the first user, a video whose number of comments or likes or shares reaches a preset value, a video of the first user included in the popular list, and so on. Accordingly, the number of the first target videos can be one or more.

Illustratively, assuming that the video show scene set by the first user is a video with a same theme, in response to the trigger operation on the event promotion control, the client filters out the first target video with the same theme as the video to be live-streamed from all the videos posted by the first user according to the theme information of the event to be live-streamed, and instructs to add the preview information of the event to be live-streamed in the first target video. For example, if the theme of the event to be live-streamed is beauty make-up, the client instructs the server to add the preview information of the event to be live-streamed in the beauty make-up videos posted by the first user in history.

Illustratively, assuming that the video show scene set by the first user is a video whose number of shares reaches 100, in response to the trigger operation on the event promotion control, the client obtains the number of shares corresponding to each video posted by the first user, selects all videos whose number of shares reaches 100 as the first target videos, and instructs the server to add the preview information of the event to be live-streamed in the first target videos.

For example, assuming that the video show scene set by the first user is a video of the first user included in the popular list, in response to the trigger operation on the event promotion control, the client obtains the popular list, judges whether the video of the first user is included in the popular list, and if so, takes all the videos of the first user included in the popular list as the first target videos.

In the embodiment of the present disclosure, the video show scene set by the first user is obtained, and in response to the trigger operation on the event promotion control, the server is instructed to add the preview information of the event to be live-streamed in the first target video, and the first target video is a video satisfying the video show scene, so that the first user can independently select the video used for promoting the event to be live-streamed, and the promotion of the live-stream event is more in line with the promotion needs of the first user.

In some implementations of the present disclosure, the method further includes: obtaining a video filtering scene set by the first user, and determining a second target video posted by the first user and satisfying the video filtering scene;

instructing the server to cancel adding the preview information of the event to be live-streamed in the second target video.

The video filtering scene can include, but is not limited to, at least one of the following: a video that the first user designates not to add, a video in which the object involved has a competitive relationship with the object involved in the live-stream event, etc. Accordingly, the number of the second target videos can be one or more.

Figure 8A:
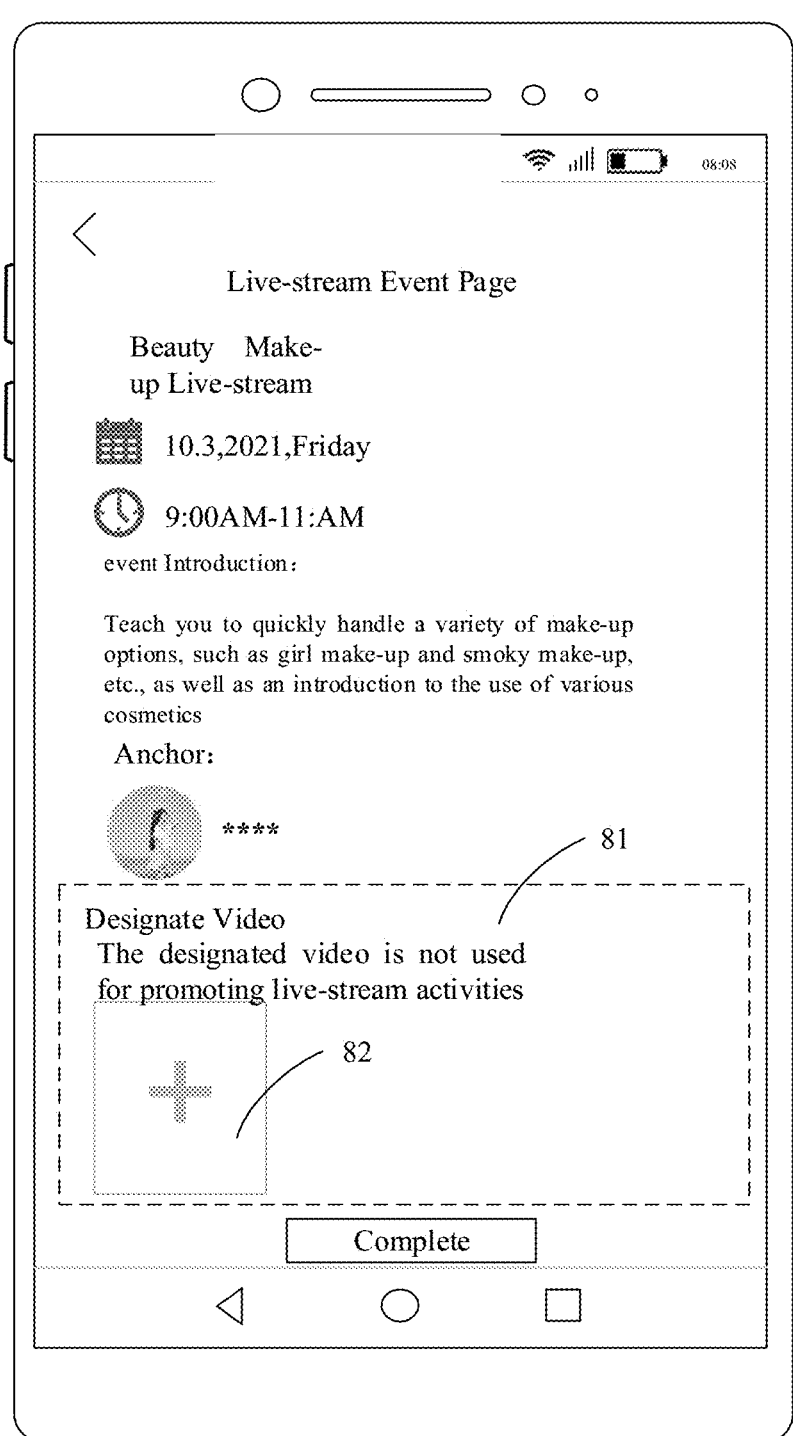
FIG. 8A is an example diagram of a live-stream event page provided by another embodiment of the present disclosure.
Figure 8B:
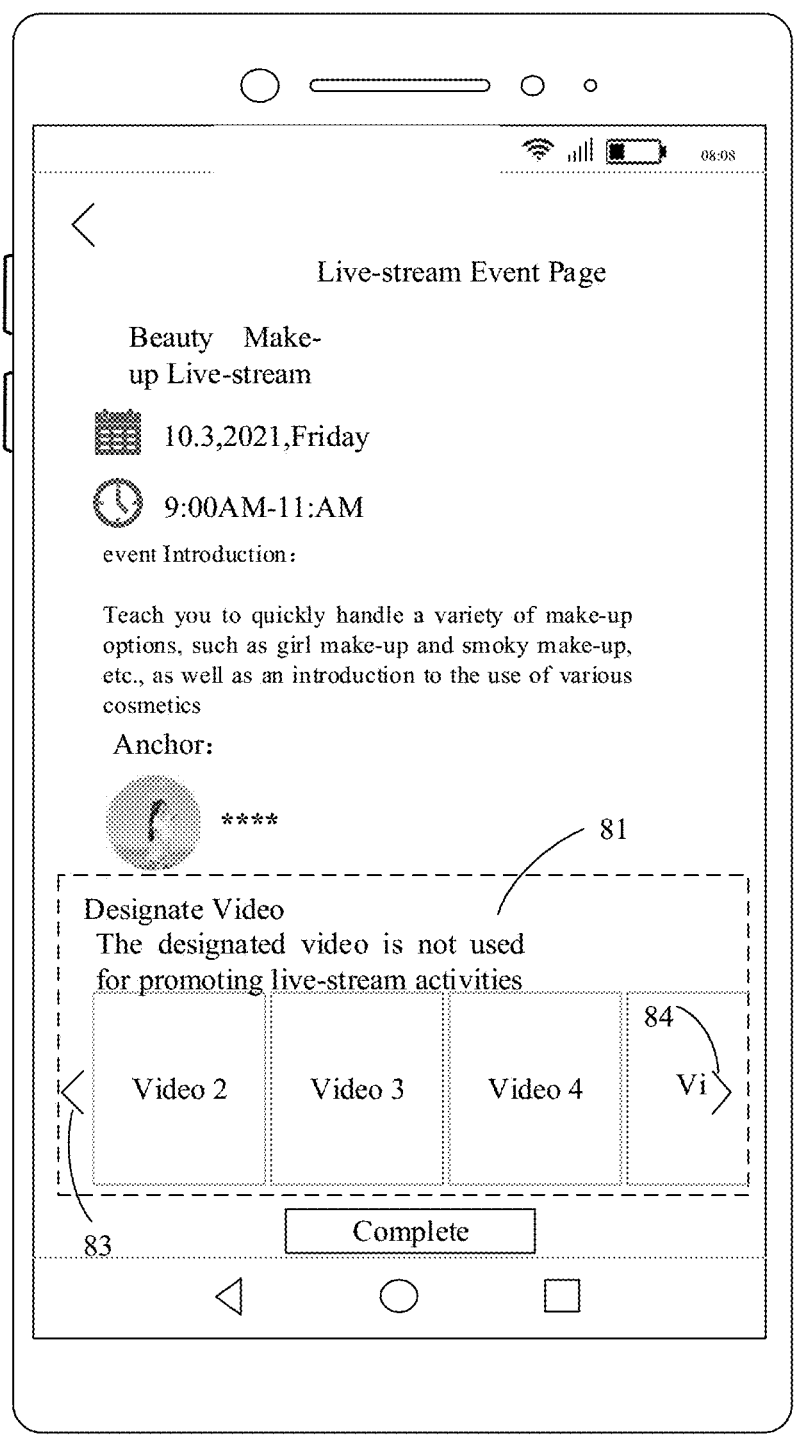
FIG. 8B is an example diagram of adding a plurality of videos in a live-stream event page provided by an embodiment of the present disclosure.

Illustratively, assuming that the video filtering scene set by the first user is a video that the first user designates not to add, the video that the first user designates not to add is the second target video, and in response to the trigger operation on the event promotion control, the server is instructed to cancel adding the preview information of the event to be live-streamed in the video that the first user designates not to add. FIG. 8A is an example diagram of a live-stream event page provided by another embodiment of the present disclosure. As shown in FIG. 8A, a designated video region 81 is provided in the live-stream event page, and the designated video region 81 is provided with a video adding entry 82, and description information of "The designated video is not used for promoting live-stream activities" is displayed. The first user can add a video by clicking on the video adding entry 82, which supports adding multiple videos. As shown in FIG. 8B, when a large number of videos are added and cannot be fully displayed in the designated video region 81, the video switching symbols "<" 83 (forward) and ">" 84 (backward) are displayed in the designated video region 81, and the first user can switch the videos displayed in the region by triggering "<" 83 or ">" 84. The video added by the first user through the video adding entry 82 will not be added with the preview information of the event to be live-streamed.

Illustratively, assuming that the video filtering scene set by the first user is a video in which the object involved has a competitive relationship with the object involved in the live-stream event. For example, the event to be-streamed is a promotion event of clothes of brand A, and the video posted by the first user with the content about the competitor of brand A is determined as the second target video; and in response to the trigger operation on the event promotion control, the server is instructed to cancel adding the preview information of the event to be live-stream in the determined second target video. For example, among the previous videos posted by the first user, the first user praised the clothes of brand B for quality and affordability in a certain video, then this video is determined as the second target video, and the server is instructed not to add the preview information about the promotion event of the clothes of brand A in this video.

In the embodiment of the present disclosure, the video filtering scene set by the first user is obtained, the second target video posted by the first user and satisfying the video filtering scene is determined, and the server is instructed to cancel adding the preview information of the event to be live-streamed in the second target video, so that the first user can independently select the video not used for promoting the event to be live-streamed, and the promotion of the live-stream event is more in line with the promotion needs of the first user.

In some implementations of the present disclosure, the instructing the server to add the preview information of the event to be live-streamed to a video posted by the first user includes:

instructing the server to add an event link to a video posted by the first user, wherein the event link is associated with an event information page of the event to be live-streamed; and/or, instructing the server to add a preview keyword of the event to be live-streamed to a video posted by the first user; and/or, instructing the server to add an event link identified with a preview keyword of the event to be live-streamed to a video posted by the first user, wherein the event link is associated with the event information page of the event to be live-streamed.

Figure 9A:
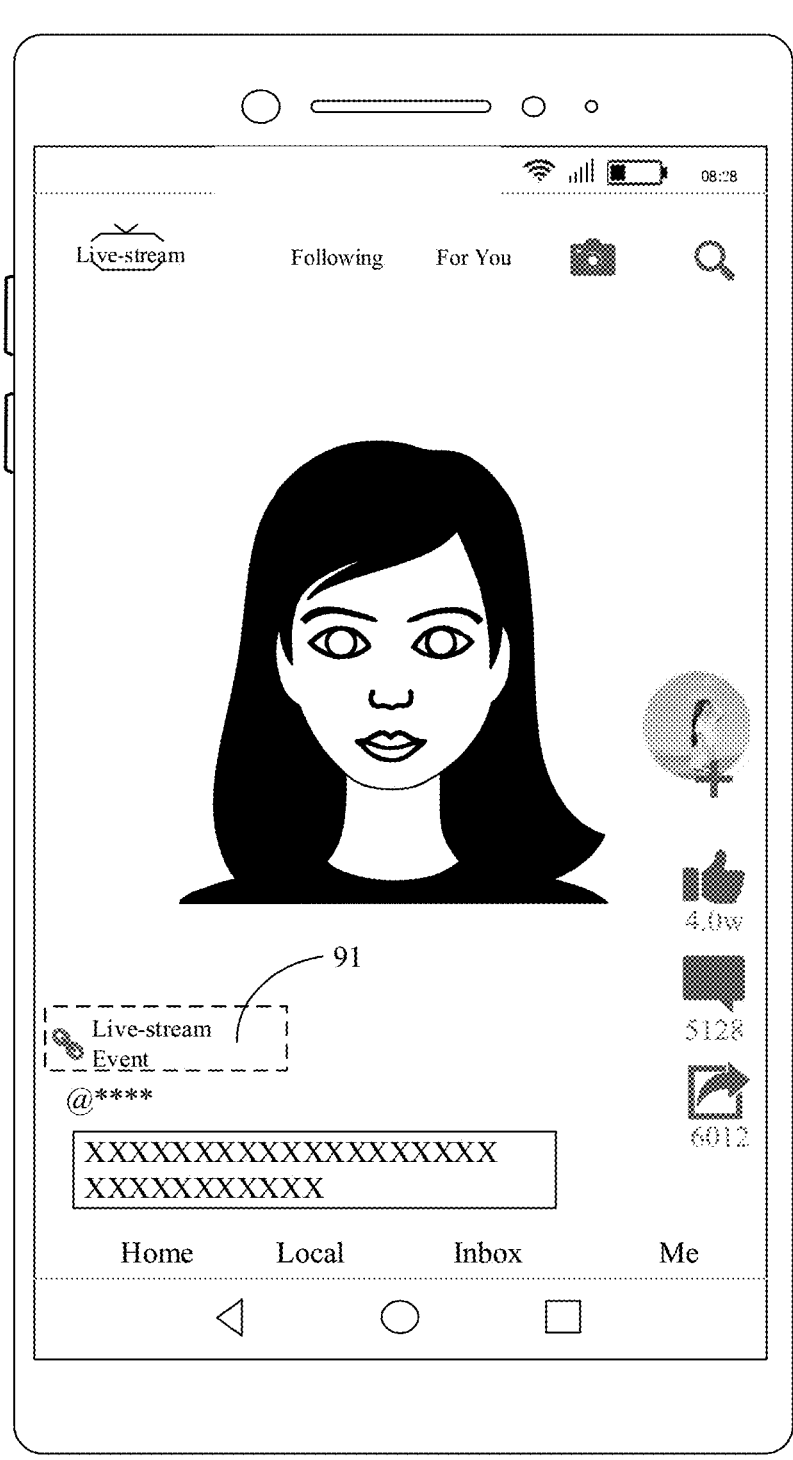
FIG. 9A is an example diagram of adding an event link to a video posted by a first user provided by an embodiment of the present disclosure.
Figure 9B:
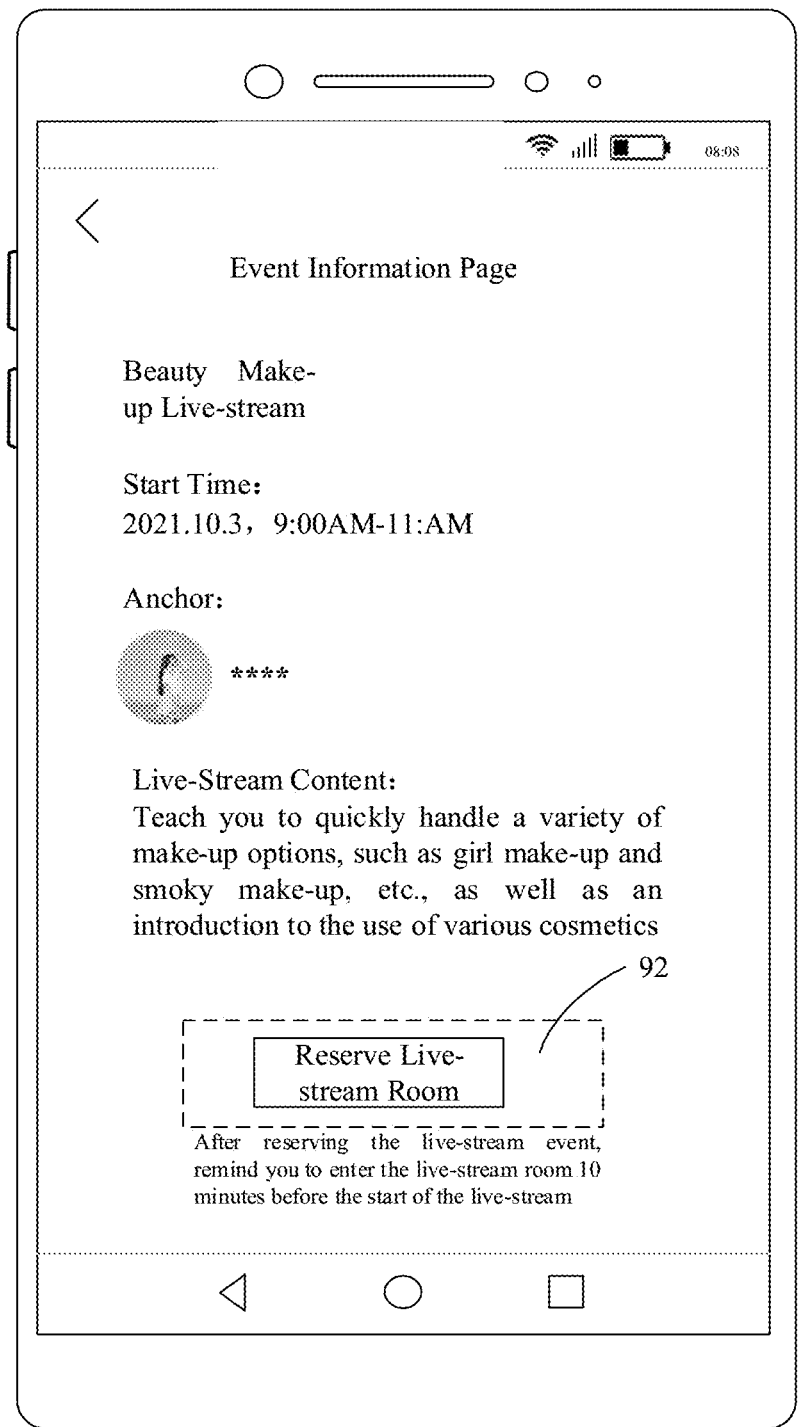
FIG. 9B is an example diagram of an event information page of an event to be live-streamed provided by an embodiment of the present disclosure.

Illustratively, FIG. 9A is an example diagram of adding an event link to a video posted by a first user provided by an embodiment of the present disclosure. As shown in FIG. 9A, an event link 91 is displayed in the video picture, and other users watching the video can enter an event information page of the event to be live-streamed associated with the event link by clicking on the event link 91, and the event information page of the event to be live-streamed is shown in FIG. 9B. As shown in FIG. 9B, the event information page displays the name, live-stream time, anchor and detailed introduction information of the event to be live-streamed, and further displays an event reservation entry 92. Users can reserve the event to be live-streamed by clicking on the event reservation entry 92, and the live-stream platform reminds users to enter the live-stream room to participate in the event to be live-streamed before the start of the event to be live-streamed (for example, 10 minutes before the start).

Figure 9C:
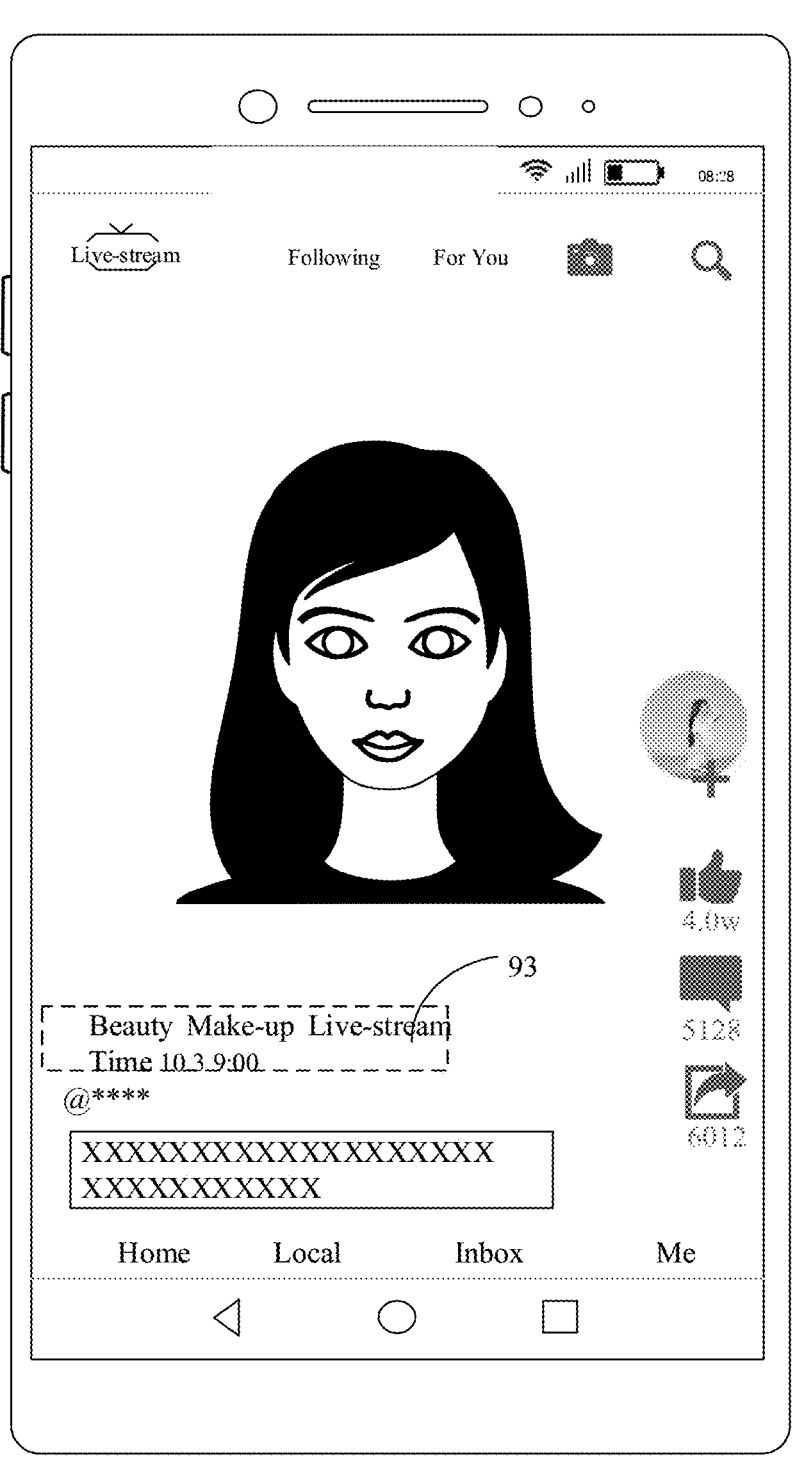
FIG. 9C is an example diagram of adding a preview keyword to a video posted by a first user provided by an embodiment of the present disclosure.

Illustratively, FIG. 9C is an example diagram of adding a preview keyword to a video posted by a first user provided by an embodiment of the present disclosure. It can be understood that FIG. 9C is only used as an example to explain the present disclosure, but not as a limitation to the present disclosure. As shown in FIG. 9C, a preview keyword 93 is displayed in the video picture, and the preview keyword 93 includes the name of the live-stream event "Beauty Make-up Live-stream" and the start time of the live-stream event "10.3 9:00". The preview keyword can also be other keywords and is not limited to the keywords in the above example.

Figure 9D:
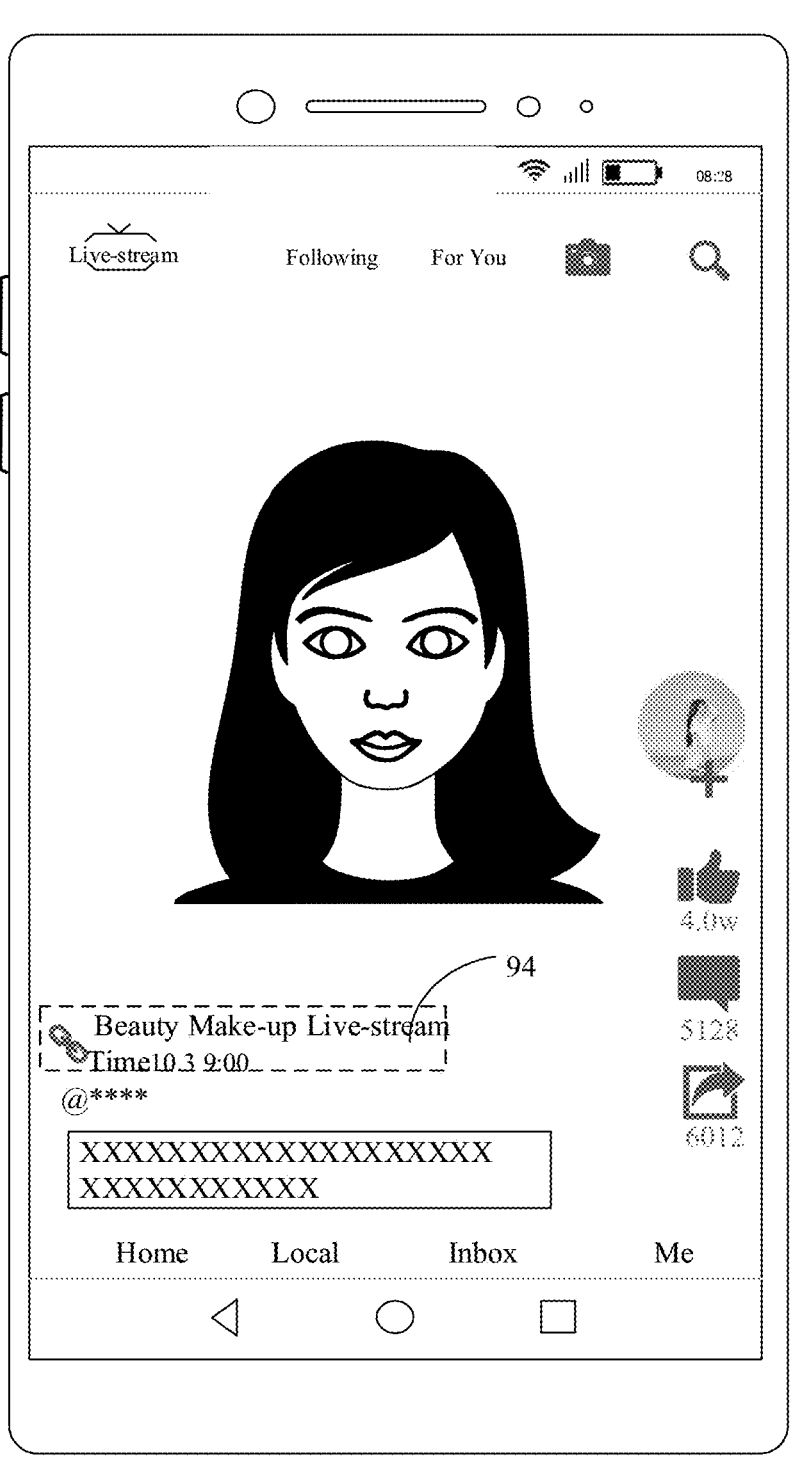
FIG. 9D is an example diagram of adding an event link identified with a preview keyword of an event to be live-streamed to a video posted by a first user provided by an embodiment of the present disclosure.

Illustratively, FIG. 9D is an example diagram of adding an event link identified with a preview keyword of an event to be live-streamed to a video posted by a first user provided by an embodiment of the present disclosure. As shown in FIG. 9D, an event link 94 identified with a preview keyword of the event to be live-streamed is displayed in the video picture, and other users watching the video can enter the event information page of the event to be live-streamed associated with the event link as shown in FIG. 9B by clicking on the event link 94 identified with the preview keyword of the event to be live-streamed.

It can be understood that instructing the server to add the event link or the preview keyword or the event link identified with the preview keyword of the event to be live-streamed in the video posted by the first user, can be automatically configured by the live-stream platform or set by the first user in the live-stream platform, which is not limited in the present disclosure. Although not shown in the figures, it can be understood that both the event link and the preview keyword can be added in the video posted by the first user, or both the event link identified with the preview keyword of the event to be live-streamed and the preview keyword can be added in the video posted by the first user, which is not limited in the present disclosure.

In the embodiment of the present disclosure, the server is instructed to add an event link in the video posted by the first user, or the server is instructed to add a preview keyword of the event to be live-streamed in the video posted by the first user, or the server is instructed to add an event link identified with a preview keyword of the event to be live-streamed in the video posted by the first user, and the event link is associated with the event information page of the event to be live-streamed, so that the server can be instructed to add corresponding content in the posted video to promote the associated event to be live-streamed, and the promotion form of the preview information of the event to be live-streamed can be enriched.

The start time of the event to be live-streamed currently newly added by the first user can be far from the current time. For example, the start time of the newly-created live-stream event of the first user is one month later, and there is still enough time to promote the event. In this case, the live-stream event may not be promoted first, and the event to be live-streamed which is closer to the current time may be promoted preferentially, so as to increase the number of viewers of the event to be live-streamed which is closer to the current time as much as possible. Therefore, in some implementations of the present disclosure, the preview information of the event to be live-streamed includes:

preview information of an event to be live-streamed with a start time closest to a current time; or, preview information of one or a plurality of activities to be live-streamed with a distance between the start time and the current time being within a preset time period.

The preset time period can be automatically configured by the live-stream platform or preset by the first user, which is not limited in the present disclosure. The preset time period can be, for example, the following 2 days, this week, and so on.

In the embodiment of the present disclosure, the event to be live-streamed can be an event to be live-streamed with a start time closest to the current time, and accordingly, the preview information of the event to be live-streamed can be preview information of the event to be live-streamed with the start time closest to the current time; or, the event to be live-streamed can also be one or a plurality of activities to be live-streamed with a distance between the start time and the current time being within a preset time period, and accordingly, the preview information of the event to be live-streamed can be preview information of the one or plurality of activities to be live-streamed with a distance between the start time and the current time being within a preset time period.

Illustratively, assuming that the preset time period is within this week, the client filters out all the live-stream activities within this week from all live-stream activities that are created by the first user and have not been started as the event to be live-streamed for promotion preview according to the current time. If the current time is Sunday, that is, the last day of this week, and there are no activities to be live-streamed on that day, the promotion of live-stream activities will not be carried out for the time being. When a new week comes, the activities to be live-streamed in this new week will be obtained for promotion preview.

In some implementations of the present disclosure, after instructing the server to add the preview information of the event to be live-streamed in the video posted by the first user, in response to a cancelling operation or ending operation of the event to be live-streamed, the server is instructed to cancel the added preview information corresponding to the event to be live-streamed in the video. Therefore, it can avoid continuing to promote the cancelled or ended live-stream activities to other users, and avoid disturbing users caused by continuing to promote the cancelled or ended live-stream activities.

FIG. 10 is a flowchart of a live-stream preview method provided by another embodiment of the present disclosure. The method can be executed by a live-stream preview apparatus provided by the embodiment of the present disclosure, and the apparatus can be implemented by software and/or hardware and can generally be integrated into a server. The server communicates with the client described in the foregoing embodiment to complete the flow of live-stream event preview.

As shown in FIG. 10, the live-stream preview method can include the following steps:

Step 201: obtaining preview information of an event to be live-streamed sent by a client, wherein the preview information of the event to be live-streamed is generated by the client after receiving a triggering operation on an event promotion control of the event to be live-streamed by a first user.

Step 202: adding the preview information of the event to be live-streamed to a video posted by the first user.

In the embodiment of the present disclosure, when the first user performs a triggering operation on the event promotion control of an event to be live-streamed through the client, the client generates preview information of the event to be live-streamed in response to the triggering operation, and the server obtains the preview information of the event to be live-streamed sent by the client.

Then, the server adds the obtained preview information of the event to be live-streamed in the video posted by the first user.

Illustratively, the server can add the preview information of the event to be live-streamed in all previous videos posted by the first user.

In the live-stream preview method according to the embodiment of the present disclosure, the server obtains the preview information of the event to be live-stream sent by the client, the preview information of the event to be live-stream is generated by the client after receiving the triggering operation on the event promotion control of the event to be live-streamed by the first user, and the preview information of the event to be live-stream is added in the video posted by the first user. By adopting the above technical solution, the user can promote the preview information of a video to be live-streamed in the video posted by the user by triggering the event promotion control, thus realizing the one-click promotion of the event to be live-streamed, and improving the convenience for the user to promote the live-stream event; moreover, by promoting the event to be live-streamed in the videos posted by the user, the user's live-stream event can be promoted by using the popularity of the user's previous videos, which is beneficial to improving the distribution efficiency of the live-stream event preview and improving the promotion effect of the live-stream event.

In some implementations of the present disclosure, the adding the preview information of the event to be live-streamed in the video posted by the first user includes:

adding the preview information of the event to be live-streamed in a first target video.

In some implementations, the first target video can be a video satisfying a preset video show scene among the predetermined videos posted by the first user.

The preset video show scene can include, but is not limited to, at least one of the following: a video of a type or theme designated by the first user, a video whose number of comments or likes or shares reaches a preset value, a video of the first user included in the popular list, and so on. Accordingly, the number of the first target videos can be one or more.

It can be understood that the description about how to determine the first target video for each video show scene in the foregoing embodiments is also applicable to the present embodiment, and to avoid repetition, details will not be repeated here.

In some implementations, the first target video can include at least one of the following:

a video posted by the first user and satisfying a preset recommendation condition as the first target video;

a video shown on a personal information page of the first use as the first target video;

a video posted by the first user and satisfying a preset hotspot condition as the first target video.

The preset recommendation condition can be, for example, that the theme of the video is related to the theme of the event to be live-streamed, or that the theme of the video is a preset theme, and so on, which is not limited in the present disclosure. The personal information page of the first user can store some or all of the videos posted by the first user, and the video shown on the personal information page can be used as the first target video. The preset hotspot condition can be, for example, that the number of comments or likes or shares reaches a preset value, or existing in a popular list, and so on, which is not limited in the present disclosure.

Illustratively, assuming that the preset recommendation condition is that the theme type of the video is food, the server filters out the video with the theme of food from all videos posted by the first user as the first target video according to the preset recommendation condition.

For example, assuming that the preset hotspot condition is that the number of comments reaches 100, the server obtains the comment data of all videos posted by the first user according to the preset hotspot condition, and filters out the video with the number of comments not less than 100 as the first target video.

In some implementations of the present disclosure, a video filtering scene can be further set to filter out the video in which the preview information of the event to be live-streamed is not added, and thus, the method further includes:

cancelling adding the preview information of the event to be live-streamed in a second target video.

In some implementations, the second target video can be a video satisfying the preset video filtering scene among all videos posted by the first user.

The preset video filtering scene can include, but is not limited to, at least one of the following: a video that the first user designates not to add, a video in which the object involved has a competitive relationship with the object involved in the live-stream event, etc.

It can be understood that the description about how to determine the second target video for each video filtering scene in the foregoing embodiment is also applicable to the present embodiment, and to avoid repetition, details will not be repeated here.

In some implementations, the second target video can include at least one of the following:

a video posted by the first user and satisfying a preset filtering keyword as the second target video;

a video posted by the first user and satisfying a preset filtering keyword as the second target video.

The preset filtering keyword can be, for example, competition, opponents, etc.

Illustratively, assuming that the preset filtering keyword is competition and the event to be live-streamed is a promotion event of clothes of brand A, the server detects the content of videos posted by the first user, and if the content of one or some videos are related to clothes of other brands, it is determined that this or these videos satisfy the preset filtering keyword "competition", and this or these videos are determined as the second target video.

In the embodiment of the present disclosure, the event video stored in the target region on the event detail page of the event to be live-streamed can also be determined as the second target videos. For example, in FIG. 8B, a plurality of videos are added in the designated video region 81 (i.e., the target region), and all the videos added in this region are determined as the second target videos.

In some implementations of the present disclosure, the adding the preview information of the event to be live-streamed in the video posted by the first user includes:

adding an event link in the video posted by the first user, wherein the event link is associated with an event information page of the event to be live-streamed; or, adding a preview keyword of the event to be live-streamed in the video posted by the first user; or, adding an event link identified with a preview keyword of the event to be live-streamed in the video posted by the first user, wherein the event link is associated with the event information page of the event to be live-streamed.

Illustratively, as shown in FIG. 9A, an event link 91 is displayed in the video picture.

Illustratively, as shown in FIG. 9C, a preview keyword 93 is displayed in the video picture, and the preview keyword 93 includes the theme of the live-stream event "Beauty Make-up Live-stream" and the start time of the live-stream event "10.3 9:00". It can be understood that FIG. 9C is only used as an example to explain the present disclosure, but not as a limitation to the present disclosure, and the preview keyword can also be other keywords.

Illustratively, as shown in FIG. 9D, an event link 94 identified with a preview keyword of the event to be live-streamed is displayed in the video picture.

In the embodiment of the present disclosure, an event link is added in the video posted by the first user, or a preview keyword of the event to be live-streamed is added in the video posted by the first user, or an event link identified with a preview keyword of the event to be live-streamed is added in the video posted by the first user, and the event link is associated with the event information page of the event to be live-streamed, so that the promotion form of the preview information of the event to be live-streamed can be enriched.

When the first user shoots a video with a special effect provided by the live-stream platform, the link of the same special effect is usually displayed in the video picture after shooting. Therefore, in some implementations of the present disclosure, the video posted by the first user further includes: a video special effect link and/or a first user demand link; wherein the priority of the event link is higher than that of the video special effect link, and/or the priority of the event link is lower than that of the first user demand link.

The first user demand link can be, but is not limited to, a geographical location link, a commodity link, etc.

Illustratively, when showing different links, the different links can be sorted and displayed in order of priority from top to bottom. When the links of the same event to be live-streamed has been displayed in the video picture, the link with rich content can be selected for display according to the content richness of different links corresponding to the event to be live-streamed. When links of different activities to be live-streamed have been displayed in the video picture, the links of the activities to be live-streamed can be displayed on a same line, or can be sorted and displayed from top to bottom in the video picture according to the start time of the activities to be live-streamed from near to far, and so on, which is not limited in the present disclosure.

FIG. 11A is a first example diagram of showing a plurality of links in a video provided by an embodiment of the present disclosure. As shown in FIG. 11A, a video special effect link 111, an event link 112 and a first user demand link 113 are displayed in the video picture, and the first user demand link 113 is illustratively a geographical location link. As can be seen from FIG. 11A, the first user demand link 113 is The first user requirement link 113 is displayed in priority and displayed in the first one, the event link 112 is displayed below the first user demand link 113, and the video special effect link 111 is displayed below the event link 112.

Figure 11B:
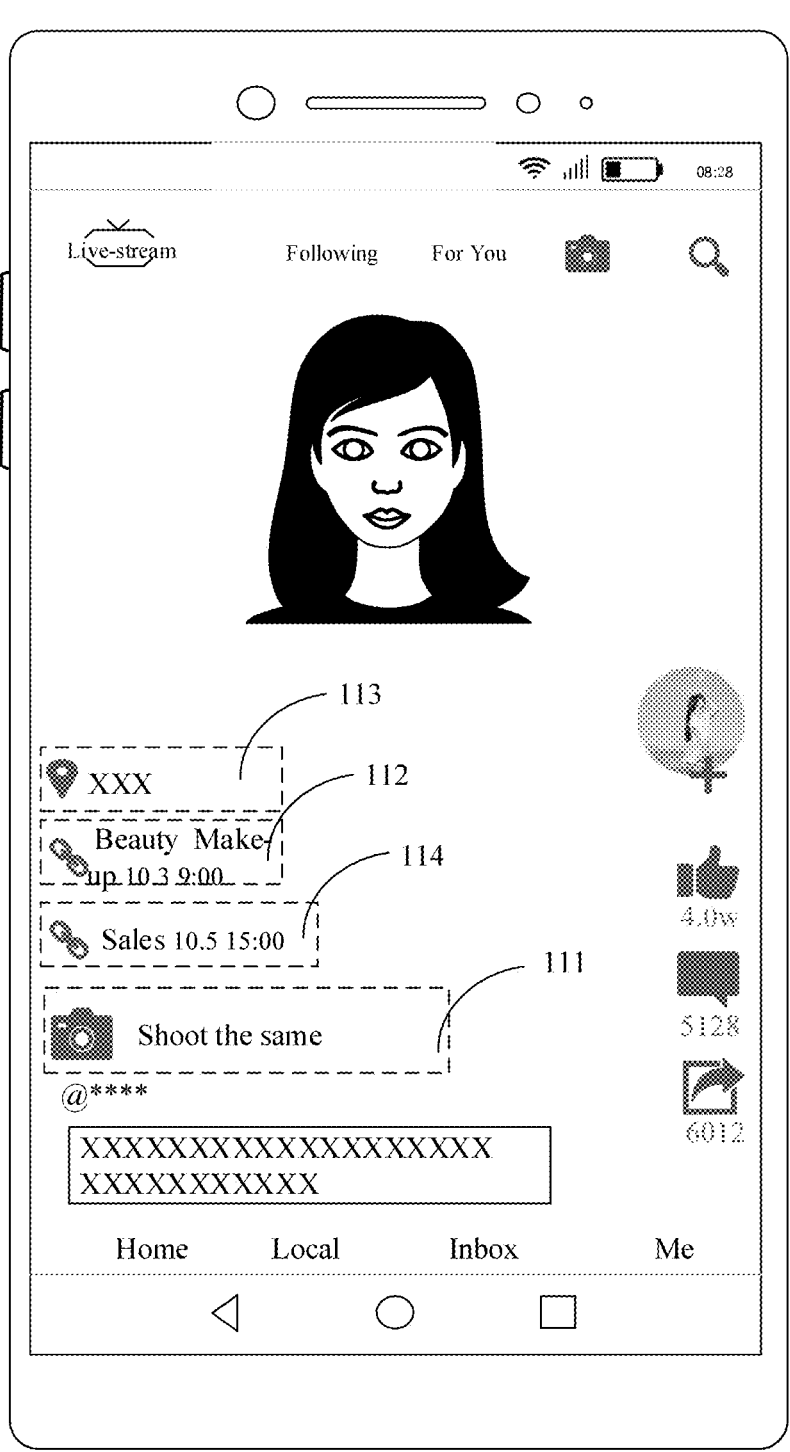
FIG. 11B is a second example diagram of showing a plurality of links in a video provided by an embodiment of the present disclosure.
Figure 11C:
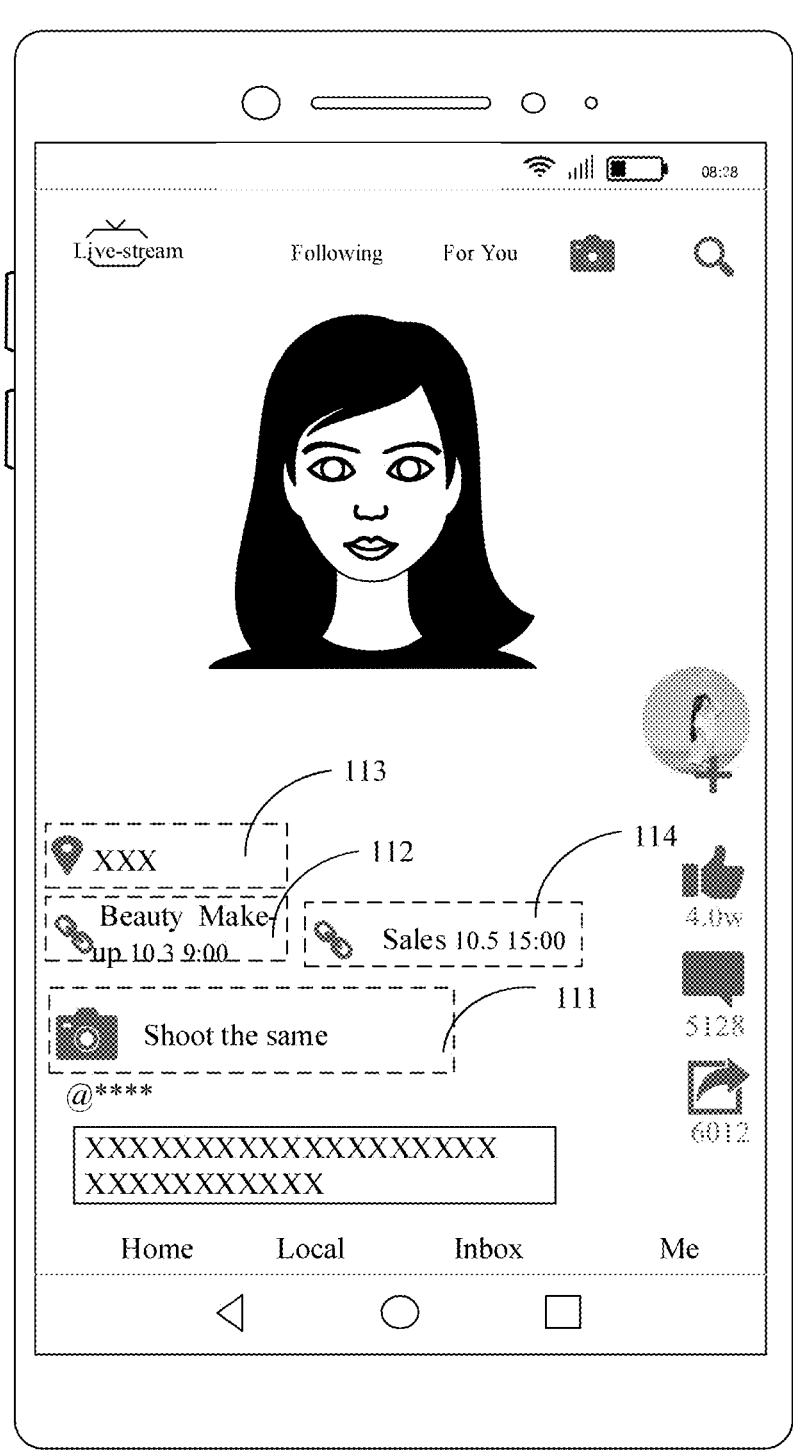
FIG. 11C is a third example diagram of showing a plurality of links in a video provided by an embodiment of the present disclosure.

FIG. 11B is a second example diagram of showing a plurality of links in a video provided by an embodiment of the present disclosure. As shown in FIG. 11B, a video special effect link 111, event links 112 and 114, and a first user demand link 113 are displayed in the video picture, wherein the event link 112 and the event link 114 are links corresponding to different live-stream activities, the start time of the live-stream event corresponding to the event link 112 is at 9:00 am on October 3rd, which is earlier than the start time of the live-stream event corresponding to the event link 114 at 3:00 pm on October 5th, so the priority of the event link 112 is higher than that of the event link 114, and the event link 112 is displayed above the event link 114; or, the event link 112 and the event link 114 can be displayed on one line, and the event link 112 is displayed in front of the event link 114, as shown in FIG. 11C.

In some implementations of the present disclosure, an event information page of the event to be live-streamed corresponding to the event link is displayed in response to a triggering operation on the event link by a second user via a client, wherein the event link is associated with the event information page of the event to be live-streamed.

The second user is any user who watches the video.

In the embodiment of the present disclosure, when the second user watches the video through the client, if an event link corresponding to an event to be live-streamed is displayed in the video picture, the second user ca trigger the event link, and the server displays the event information page of the event to be live-streamed associated with the event link in response to the triggering operation of the event link by the second user. Therefore, it is convenient for the second user to know the relevant information of the event to be live-streamed corresponding to the event link.

Illustratively, as shown in FIG. 9A, an event link 91 is displayed in the video picture. When the second user performs a triggering operation on the event link 91, the server, in response to the triggering operation, displays the event information page of the event to be live-streamed associated with the event link 91, as shown in FIG. 9B.

In some implementations of the present disclosure, after adding the preview information of the event to be live-streamed in the video posted by the first user, the method further includes:

cancelling, in response to a cancelling operation of the event to be live-streamed by the first user through the client or detecting an ending operation of the event to be live-streamed, the added preview information corresponding to the event to be live-streamed in the video.

In the embodiment of the present disclosure, when the first user cancels the event to be live-streamed through the client, in response to the cancelling operation of the event to be live-streamed by the first user, or when the live-stream of the event to be live-streamed ends, in response to the ending operation of the event to be live-streamed, the added preview information corresponding to the event to be live-streamed is cancelled. Therefore, it can avoid continuing to promote the cancelled or ended live-stream activities to other users, and avoid disturbing users caused by continuing to promote the cancelled or ended live-stream activities.

Figure 12:
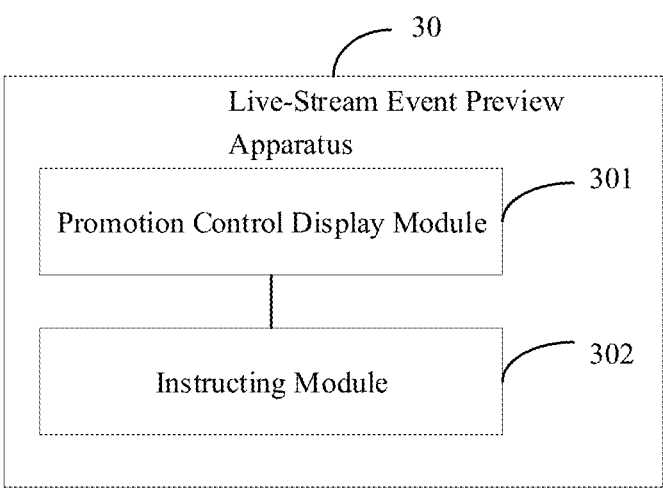
FIG. 12 is a schematic structural diagram of a live-stream preview apparatus provided by an embodiment of the present disclosure.

FIG. 12 is a schematic structural diagram of a live-stream preview apparatus provided by an embodiment of the present disclosure. The apparatus can be implemented by software and/or hardware, and can generally be integrated into an electronic device. The electronic device can be a client device held by an anchor (the first user in the following embodiments) who needs to promote a live-stream event, and the client device includes but is not limited to a smart phone, a tablet computer, a wearable device or the like, with live-stream software installed thereon. As shown in FIG. 12, the live-stream preview apparatus 30 can include:

a promotion control display module 301, configured to display an event promotion control on a page corresponding to a live-stream event created by a first user;

an instructing module 302, configured to instruct, in response to a trigger operation on the event promotion control, a server to add preview information of the event to be live-streamed to a video posted by the first user.

The live-stream preview apparatus provided by the embodiment of the present disclosure can execute the live-stream preview method provided by any embodiment of the present disclosure, and has corresponding functional modules for executing the method and corresponding beneficial effects.

Figure 13:
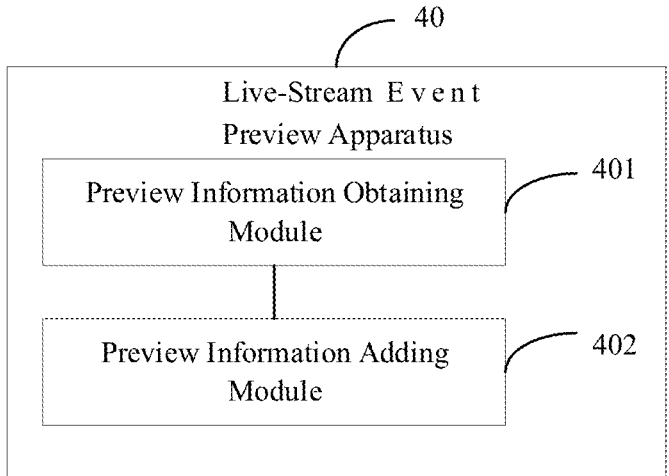
FIG. 13 is a schematic structural diagram of another live-stream preview apparatus provided by an embodiment of the present disclosure.

FIG. 13 is a schematic structural diagram of another live-stream preview apparatus provided by an embodiment of the present disclosure. The apparatus can be implemented by software and/or hardware and can generally be integrated into a server. The server communicates with the client described in the foregoing embodiment to complete the flow of live-stream event preview. As shown in FIG. 13, the live-stream preview apparatus 40 can include:

a preview information obtaining module 401, configured to obtain preview information of an event to be live-streamed sent by a client, wherein the preview information of the event to be live-streamed is generated by the client after receiving a triggering operation on an event promotion control of the event to be live-streamed by a first user;

a preview information adding module 402, configured to add the preview information of the event to be live-streamed to a video posted by the first user.

The live-stream preview apparatus provided by the embodiment of the present disclosure can execute the live-stream preview method provided by any embodiment of the present disclosure, and has corresponding functional modules for executing the method and corresponding beneficial effects.

In order to realize the above embodiments, the present disclosure further provides a computer program product which includes computer program/instructions, and the computer program/instructions, when executed by a processor, realize the live-stream preview method described in the above embodiments.

Figure 14:
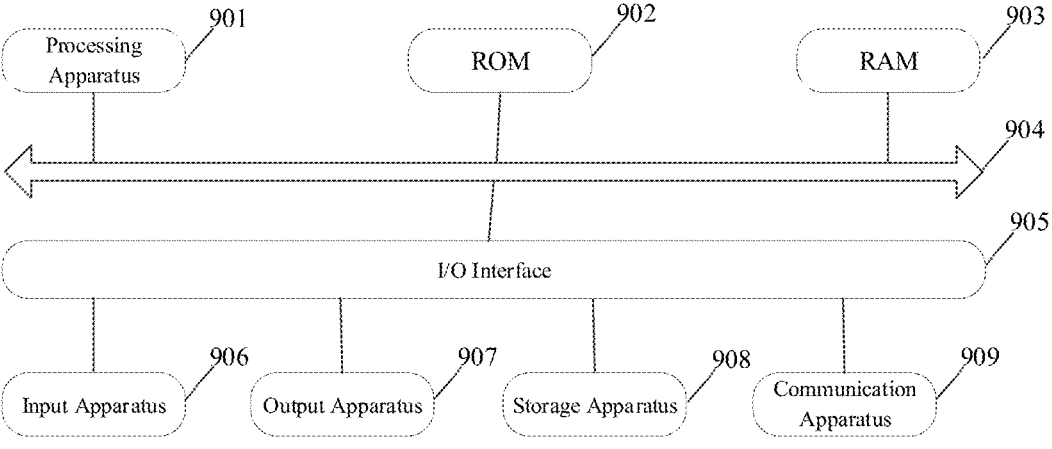
FIG. 14 is a schematic structural diagram of an electronic device provided by an embodiment of the present disclosure.

FIG. 14 is a schematic structural diagram of an electronic device provided by an embodiment of the present disclosure.

Referring specifically to FIG. 14, FIG. 14 illustrates a schematic structural diagram of an electronic device 900 suitable for implementing the embodiment of the present disclosure. The electronic device 900 in the embodiment of the present disclosure can include, but is not limited to, a mobile terminal such as a mobile phone, a notebook computer, a digital broadcast receiver, a PDA (Personal Digital Assistant), a PAD (tablet computer), a PMP (Portable Multimedia Player), a vehicle-mounted terminal (e.g., vehicle-mounted navigation terminal), etc., and a fixed terminal such as a digital TV, a desktop computer, etc. The electronic device shown in FIG. 14 is only an example, and should not bring any limitation to the function and the use scope of the embodiment of the present disclosure.

As shown in FIG. 14, the electronic device 900 can include a processing apparatus (e.g., central processing unit, graphics processing unit, etc.) 901, which can execute various suitable actions and processes according to a program stored in a read-only memory (ROM) 902 or a program loaded from a storage apparatus 908 into a random access memory (RAM) 903. In the RAM 903, various programs and data necessary for the operations of the electronic device 900 are also stored. The processing apparatus 901, the ROM

902, and the RAM 903 are connected to each other through a bus 904. An input/output (I/O) interface 905 is also connected to the bus 904.

Generally, the following apparatuses can be connected to the I/O interface 905: an input apparatus 906 including, for example, a touch screen, a touch pad, a keyboard, a mouse, a camera, a microphone, an accelerometer, a gyroscope, etc.; an output apparatus 907 including, for example, a liquid crystal display (LCD), a speaker, a vibrator, etc.; a storage apparatus 908 including, for example, a magnetic tape, a hard disk, etc.; and a communication apparatus 909. The communication apparatus 909 can allow the electronic device 900 to perform wireless or wired communication with another device to exchange data. While FIG. 14 illustrates the electronic device 900 with various apparatuses, it should be understood that all illustrated apparatuses are not required to be implemented or provided. More or fewer apparatuses can be alternatively implemented or provided.

In particular, according to the embodiment of the present disclosure, the process described above with reference to the flowcharts can be implemented as a computer software program. For example, an embodiment of the present disclosure includes a computer program product including a computer program carried on a non-transitory computer-readable medium, and the computer program contains program codes for performing the method illustrated by the flowcharts. In such an embodiment, the computer program can be downloaded and installed from a network via the communication apparatus 909, or installed from the storage apparatus 908, or installed from the ROM 902. When executed by the processing apparatus 401, the computer program performs the above functions defined in the live-stream preview method according to the embodiment of the present disclosure.

It should be noted that the above computer-readable medium of the present disclosure can be a computer-readable signal medium or a computer-readable storage medium or any combination thereof. The computer-readable storage medium can be, for example, but not limited to, an electronic, magnetic, optical, electromagnetic, infrared, or semiconductor system, apparatus, or device, or any combination of the above. More specific examples of the computer-readable storage medium can include, but are not limited to: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the above. In the present disclosure, the computer-readable storage medium can be any tangible medium containing or storing a program, wherein the program can be used by or in conjunction with an instruction execution system, apparatus, or device. However, in the present disclosure, the computer-readable signal medium can include a data signal propagated in baseband or as part of a carrier wave, in which computer-readable program code is carried. Such a propagated data signal can take a variety of forms, including but not limited to an electro-magnetic signal, an optical signal, or any suitable combination of the above. The computer-readable signal medium can be any computer-readable medium other than the computer-readable storage medium, and the computer-readable signal medium can send, propagate, or transmit a program for use by or in conjunction with an instruction execution system, apparatus, or device. Program codes contained on the computer-readable medium can be transmitted using any suitable medium, including but not limited to: an electrical wire, an optical cable, RF (radio frequency), etc., or any suitable combination of the above.

In some implementations, a client and a server can communicate using any currently known or future developed network protocol, such as HTTP (Hyper Text Transfer Protocol), etc., and can be interconnected with any form or medium of digital data communication (e.g., a communication network). Examples of the communication network include a local area network ("LAN"), a wide area network ("WAN"), an internet (e.g., the Internet), and a peer-to-peer network (e.g., ad hoc peer-to-peer network), as well as any currently known or future developed network.

The computer-readable medium can be contained in the above electronic device; or can exist alone and not be assembled into the electronic device.

The above computer-readable medium has thereon carried one or more programs which, when executed by the electronic device, cause the electronic device to: display an event promotion control on a page corresponding to a live-stream event created by a first user; and instruct, in response to a trigger operation of the event promotion control, a server to add preview information of the event to be live-streamed to a video posted by the first user; or cause the electronic device to: obtain preview information of an event to be live-streamed sent by a client, wherein the preview information of the event to be live-streamed is generated by the client after receiving a triggering operation of an event promotion control of the event to be live-streamed by a first user; and add the preview information of the event to be live-streamed to a video posted by the first user.

Computer program codes for performing operations of the present disclosure can be written in one or more programming languages or a combination thereof, wherein the programming language includes, but is not limited to, an object-oriented programming language such as Java, Smalltalk, C++, and also includes a conventional procedural programming language such as a "C" language or similar programming language. The program codes can be executed entirely on a user computer, partly on the user computer, as a stand-alone software package, partly on the user computer and partly on a remote computer, or entirely on the remote computer or server. In a scene where the remote computer is involved, the remote computer can be connected to the user computer through any type of network, including a local area network (LAN) or a wide area network (WAN), or can be connected to an external computer (for example, through the Internet using an Internet service provider).

The flowcharts and block diagrams in the accompanying drawings illustrate the possibly implemented architecture, functions, and operations of the system, method and computer program product according to various embodiments of the present disclosure. In this regard, each block in the flowcharts or block diagrams can represent one module, program segment, or portion of code, which contains one or more executable instructions for implementing the specified logic function. It should also be noted that, in some alternative implementations, functions noted in blocks can occur in an order different from an order noted in the drawings. For example, two blocks shown in succession can, in fact, be executed substantially concurrently, and they can sometimes be executed in a reverse order, which depends upon functions involved. It will also be noted that each block in the block diagrams and/or flowcharts, and a combination of blocks in the block diagrams and/or flowcharts, can be implemented by a dedicated hardware-based system that performs a specified function or operation, or a combination of dedicated hardware and computer instructions.

The involved unit described in the embodiment of the present disclosure can be implemented by software or hardware. The name of the unit does not, in some cases, constitute a limitation on the unit itself.

The functions described herein above can be performed, at least in part, by one or more hardware logic components. For example, without limitation, an exemplary type of hardware logic component that can be used includes: a field programmable gate array (FPGA), an application specific integrated circuit (ASIC), an application specific standard product (ASSP), a system on a chip (SOC), a complex programmable logic device (CPLD), and so on.

In the context of the present disclosure, a machine-readable medium can be a tangible medium, which can contain or store a program for use by or in conjunction with an instruction execution system, apparatus, or device. The machine-readable medium can be a machine-readable signal medium or a machine-readable storage medium. The machine-readable medium can include, but is not limited to, an electronic, magnetic, optical, electromagnetic, infrared, or semiconductor system, apparatus, or device, or any suitable combination of the above. More specific examples of the machine-readable storage medium would include an electrical connection based on one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the above.

According to one or more embodiments of the present disclosure, the present disclosure provides a live-stream preview method, which includes:

displaying an event promotion control on a page corresponding to a live-stream event created by a first user;

instructing, in response to a trigger operation on the event promotion control, a server to add preview information of the event to be live-streamed to a video posted by the first user.

According to one or more embodiments of the present disclosure, in the live-stream preview method provided by the present disclosure, the displaying the event promotion control on the page corresponding to the live-stream event created by the first user includes:

displaying, in response to the first user's completing operation of a current newly-created live-stream event, guidance information for determining whether to add an event promotion function;

displaying, in response to an adding operation of the event promotion function in the guidance information, a first event promotion control in a first preset region on the live-stream event page, wherein the first event promotion control is used to indicate whether the server enables a promotion function for the current newly-created live-stream event, and the current newly-created live-stream event is a live-stream event that has been currently newly created and displayed on the live-stream event page.

According to one or more embodiments of the present disclosure, in the live-stream preview method provided by the present disclosure, the method further includes:

detecting, in response to a rejecting operation of the event promotion function on the page, whether a cumulative number of rejecting operations reaches a preset threshold;

if the cumulative number reaches the preset threshold, not displaying the guidance information for determining whether to add an event promotion function for a subsequent newly-created live-stream event.

According to one or more embodiments of the present disclosure, in the live-stream preview method provided by the present disclosure, after the displaying, in response to the adding operation of the event promotion function in the guidance information, the first event promotion control in the first preset region on the live-stream event page, the method further includes:

displaying a second event promotion control in a second preset region on the live-stream event page, wherein the second event promotion control is used to instruct the server whether to enable a promotion function for a subsequent newly-created live-stream event.

According to one or more embodiments of the present disclosure, in the live-stream preview method provided by the present disclosure, the method further includes:

in response to a triggering operation on the second event promotion control, not displaying the guidance information for determining whether to add an event promotion function for a subsequent newly-created live-stream event.

According to one or more embodiments of the present disclosure, in the live-stream preview method provided by the present disclosure, the displaying the event promotion control on the page corresponding to the live-stream event created by the first user includes:

displaying, in response to a viewing operation on a live-stream event list, a live-stream event list page created by the first user, wherein a first entry identifier is set on the live-stream event list page;

displaying, in response to a triggering operation on the first entry identifier, a third event promotion control in a third preset region on the live-stream event list page, wherein the third event promotion control is used to instruct the server whether to enable a promotion function for a subsequent newly-created live-stream event.

According to one or more embodiments of the present disclosure, in the live-stream preview method provided by the present disclosure, the live-stream event list page further includes information of a plurality of activities to be live-streamed, wherein information of each event to be live-streamed is correspondingly provided with a second entry identifier, and the method further includes:

displaying, in response to a triggering operation on the second entry identifier corresponding to information of any event to be live-streamed, a fourth event promotion control corresponding to the information of the event to be live-streamed in a fourth preset region on the live-stream event list page, wherein the fourth event promotion control is used to instruct the server whether to enable a promotion function for the information of the any event to be live-streamed.

According to one or more embodiments of the present disclosure, in the live-stream preview method provided by the present disclosure, the method further includes:

displaying, for an event to be live-streamed with an activated event promotion control, a promotion identifier in a title region of the event to be live-streamed on the live-stream event list page.

According to one or more embodiments of the present disclosure, in the live-stream preview method provided by the present disclosure, the instructing, in response to the trigger operation on the event promotion control, the server to add the preview information of the event to be live-streamed in the video posted by the first user includes:

obtaining a video show scene set by the first user;

instructing, in response to the trigger operation on the event promotion control, the server to add the preview information of the event to be live-streamed in a first target video, wherein the first target video is a video satisfying the video show scene.

According to one or more embodiments of the present disclosure, in the live-stream preview method provided by the present disclosure, the method further includes:

obtaining a video filtering scene set by the first user, and determining a second target video posted by the first user and satisfying the video filtering scene;

instructing the server to cancel adding the preview information of the event to be live-streamed in the second target video.

According to one or more embodiments of the present disclosure, in the live-stream preview method provided by the present disclosure, the instructing the server to add the preview information of the event to be live-streamed in the video posted by the first user includes:

instructing the server to add an event link in the video posted by the first user, wherein the event link is associated with an event information page of the event to be live-streamed; and/or, instructing the server to add a preview keyword of the event to be live-streamed in the video posted by the first user; and/or, instructing the server to add an event link identified with a preview keyword of the event to be live-streamed in the video posted by the first user, wherein the event link is associated with the event information page of the event to be live-streamed.

According to one or more embodiments of the present disclosure, in the live-stream preview method provided by the present disclosure, the preview information of the event to be live-streamed includes:

preview information of an event to be live-streamed with a start time closest to a current time; or, preview information of one or a plurality of activities to be live-streamed with a distance between the start time and the current time being within a preset time period.

According to one or more embodiments of the present disclosure, in the live-stream preview method provided by the present disclosure, after instructing the server to add the preview information of the event to be live-streamed in the video posted by the first user, the method further includes:

instructing, in response to a cancelling operation or ending operation of the event to be live-streamed, the server to cancel the added preview information corresponding to the event to be live-streamed in the video.

According to one or more embodiments of the present disclosure, the present disclosure provides a live-stream preview method, which includes:

obtaining preview information of an event to be live-streamed sent by a client, wherein the preview information of the event to be live-streamed is generated by the client after receiving a triggering operation on an event promotion control of the event to be live-streamed by a first user;

adding the preview information of the event to be live-streamed to a video posted by the first user.

According to one or more embodiments of the present disclosure, in the live-stream preview method provided by the present disclosure, the adding the preview information of the event to be live-streamed in the video posted by the first user includes:

adding the preview information of the event to be live-streamed in a first target video, wherein the first target video includes at least one of the following:

a video posted by the first user and satisfying a preset recommendation condition as the first target video;

a video shown on a personal information page of the first use as the first target video;

a video posted by the first user and satisfying a preset hotspot condition as the first target video.

According to one or more embodiments of the present disclosure, in the live-stream preview method provided by the present disclosure, the method further includes:

cancelling adding the preview information of the event to be live-streamed in a second target video, wherein the second target video includes at least one of the following:

a video posted by the first user and satisfying a preset filtering keyword as the second target video;

an event video stored in a target region on an event detail page of the event to be live-streamed as the second target video.

According to one or more embodiments of the present disclosure, in the live-stream preview method provided by the present disclosure, the adding the preview information of the event to be live-streamed in the video posted by the first user includes:

adding an event link in the video posted by the first user, wherein the event link is associated with an event information page of the event to be live-streamed; or, adding a preview keyword of the event to be live-streamed in the video posted by the first user; or, adding an event link identified with a preview keyword of the event to be live-streamed in the video posted by the first user, wherein the event link is associated with the event information page of the event to be live-streamed.

According to one or more embodiments of the present disclosure, in the live-stream preview method provided by the present disclosure, the video posted by the first user further includes: a video special effect link and/or a first user demand link; wherein the priority of the event link is higher than that of the video special effect link, and/or the priority of the event link is lower than that of the first user demand link.

According to one or more embodiments of the present disclosure, in the live-stream preview method provided by the present disclosure, the method further includes:

displaying, in response to a triggering operation on the event link by a second user via a client, an event information page of an event to be live-streamed corresponding to an event link, wherein the event link is associated with the event information page of the event to be live-streamed.

According to one or more embodiments of the present disclosure, in the live-stream preview method provided by the present disclosure, after adding the preview information of the event to be live-streamed in the video posted by the first user, the method further includes:

cancelling, in response to a cancelling operation of the event to be live-streamed by the first user through the client or detecting an ending operation of the event to be live-streamed, the added preview information corresponding to the event to be live-streamed in the video.

According to one or more embodiments of the present disclosure, the present disclosure provides a live-stream preview apparatus, which includes:

a promotion control display module, configured to display an event promotion control on a page corresponding to a live-stream event created by a first user;

an instructing module, configured to instruct, in response to a trigger operation on the event promotion control, a server to add preview information of the event to be live-streamed to a video posted by the first user.

According to one or more embodiments of the present disclosure, in the live-stream preview apparatus provided by the present disclosure, the promotion control display module includes:

an adding inquiry unit, configured to display, in response to the first user's completing operation of a current newly-created live-stream event, guidance information for determining whether to add an event promotion function;

a first display unit, configured to display, in response to an adding operation of the event promotion function in the guidance information, a first event promotion control in a first preset region on the live-stream event page, wherein the first event promotion control is used to indicate whether the server enables a promotion function for the current newly-created live-stream event, and the current newly-created live-stream event is a live-stream event that has been currently newly created and displayed on the live-stream event page.

According to one or more embodiments of the present disclosure, in the live-stream preview apparatus provided by the present disclosure, the apparatus further includes:

a detecting module, configured to detect, in response to a rejecting operation of the event promotion function in the guidance information, whether a cumulative number of rejecting operations reaches a preset threshold;

a cancelling inquiry module, configured to not display the guidance information for determining whether to add an event promotion function for a subsequent newly-created live-stream event if the cumulative number reaches the preset threshold.

According to one or more embodiments of the present disclosure, in the live-stream preview apparatus provided by the present disclosure, the apparatus further includes:

a first display module, configured to display a second event promotion control in a second preset region on the live-stream event page, wherein the second event promotion control is used to instruct the server whether to enable a promotion function for a subsequent newly-created live-stream event.

According to one or more embodiments of the present disclosure, in the live-stream preview apparatus provided by the present disclosure, the apparatus further includes:

a stop inquiry module, configured to not display the guidance information for determining whether to add an event promotion function for a subsequent newly-created live-stream event in response to a triggering operation on the second event promotion control.

According to one or more embodiments of the present disclosure, in the live-stream preview apparatus provided by the present disclosure, the promotion control display module includes:

an event list display unit, configured to display, in response to a viewing operation on a live-stream event list, a live-stream event list page created by the first user, wherein a first entry identifier is set on the live-stream event list page;

a second display unit, configured to display, in response to a triggering operation on the first entry identifier, a third event promotion control in a third preset region on the live-stream event list page, wherein the third event promotion control is used to instruct the server whether to enable a promotion function for a subsequent newly-created live-stream event.

According to one or more embodiments of the present disclosure, in the live-stream preview apparatus provided by the present disclosure, the live-stream event list page further includes information of a plurality of activities to be live-streamed, wherein information of each event to be live-streamed is correspondingly provided with a second entry identifier, and the apparatus further includes:

a second display module, configured to display, in response to a triggering operation on the second entry identifier corresponding to information of any event to be live-streamed, a fourth event promotion control corresponding to the information of the event to be live-streamed in a fourth preset region on the live-stream event list page, wherein the fourth event promotion control is used to instruct the server whether to enable a promotion function for the information of the any event to be live-streamed.

According to one or more embodiments of the present disclosure, in the live-stream preview apparatus provided by the present disclosure, the apparatus further includes:

an identifier display module, configured to display, for an event to be live-streamed with an activated event promotion control, a promotion identifier in a title region of the event to be live-streamed on the live-stream event list page.

According to one or more embodiments of the present disclosure, in the live-stream preview apparatus provided by the present disclosure, the instructing module includes:

a show scene obtaining unit, configured to obtain a video show scene set by the first user;

an instructing unit, configured to instruct, in response to the trigger operation on the event promotion control, the server to add the preview information of the event to be live-streamed in a first target video, wherein the first target video is a video satisfying the video show scene.

According to one or more embodiments of the present disclosure, in the live-stream preview apparatus provided by the present disclosure, the apparatus further includes:

a filtering scene obtaining module, configured to obtain a video filtering scene set by the first user, and determine a second target video posted by the first user and satisfying the video filtering scene;

an instructing cancelling adding module, configured to instruct the server to cancel adding the preview information of the event to be live-streamed in the second target video.

According to one or more embodiments of the present disclosure, in the live-stream preview apparatus provided by the present disclosure, the instructing module is further configured to:

instruct the server to add an event link in the video posted by the first user, wherein the event link is associated with an event information page of the event to be live-streamed; and/or, instruct the server to add a preview keyword of the event to be live-streamed in the video posted by the first user; and/or, instruct the server to add an event link identified with a preview keyword of the event to be live-streamed in the video posted by the first user, wherein the event link is associated with the event information page of the event to be live-streamed.

According to one or more embodiments of the present disclosure, in the live-stream preview apparatus provided by the present disclosure, the preview information of the event to be live-streamed includes:

preview information of an event to be live-streamed with a start time closest to a current time; or, preview information of one or a plurality of activities to be live-streamed with a distance between the start time and the current time being within a preset time period.

According to one or more embodiments of the present disclosure, in the live-stream preview apparatus provided by the present disclosure, the apparatus further includes:

an instructing cancelling preview information module, configured to instruct, in response to a cancelling operation or ending operation of the event to be live-streamed, the server to cancel the added preview information corresponding to the event to be live-streamed in the video.

According to one or more embodiments of the present disclosure, the present disclosure provides a live-stream preview apparatus, which includes:

a preview information obtaining module, configured to obtain preview information of an event to be live-streamed sent by a client, wherein the preview information of the event to be live-streamed is generated by the client after receiving a triggering operation on an event promotion control of the event to be live-streamed by a first user;

a preview information adding module, configured to add the preview information of the event to be live-streamed to a video posted by the first user.

According to one or more embodiments of the present disclosure, in the live-stream preview apparatus provided by the present disclosure, the preview information adding module is specifically configured to:

add the preview information of the event to be live-streamed in a first target video, wherein the first target video includes at least one of the following:

a video posted by the first user and satisfying a preset recommendation condition as the first target video;

a video shown on a personal information page of the first use as the first target video;

a video posted by the first user and satisfying a preset hotspot condition as the first target video.

According to one or more embodiments of the present disclosure, in the live-stream preview apparatus provided by the present disclosure, the apparatus further includes:

a cancelling adding module, configured to cancel adding the preview information of the event to be live-streamed in a second target video, wherein the second target video includes at least one of the following:

a video posted by the first user and satisfying a preset filtering keyword as the second target video;

an event video stored in a target region on an event detail page of the event to be live-streamed as the second target video.

According to one or more embodiments of the present disclosure, in the live-stream preview apparatus provided by the present disclosure, the preview information adding module is further configured to:

add an event link in the video posted by the first user, wherein the event link is associated with an event information page of the event to be live-streamed; or, add a preview keyword of the event to be live-streamed in the video posted by the first user; or, add an event link identified with a preview keyword of the event to be live-streamed in the video posted by the first user, wherein the event link is associated with the event information page of the event to be live-streamed.

According to one or more embodiments of the present disclosure, in the live-stream preview apparatus provided by the present disclosure, the video posted by the first user further includes: a video special effect link and/or a first user demand link; wherein the priority of the event link is higher than that of the video special effect link, and/or the priority of the event link is lower than that of the first user demand link.

According to one or more embodiments of the present disclosure, in the live-stream preview apparatus provided by the present disclosure, the apparatus further includes:

an event information show module, configured to display, in response to a triggering operation on the event link by a second user via a client, an event information page of an event to be live-streamed corresponding to an event link, wherein the event link is associated with the event information page of the event to be live-streamed.

According to one or more embodiments of the present disclosure, in the live-stream preview apparatus provided by the present disclosure, the apparatus further includes:

a cancelling module, configured to cancel, in response to a cancelling operation of the event to be live-streamed by the first user through the client or detecting an ending operation of the event to be live-streamed, the added preview information corresponding to the event to be live-streamed in the video.

According to one or more embodiments of the present disclosure, the present disclosure provides an electronic device, which includes:

a processor; and a memory, configured to store executable instructions of the processor;

wherein the processor is configured to read the executable instructions from the memory and execute the instructions to realize any one of the live-stream preview methods provided in the present disclosure.

According to one or more embodiments of the present disclosure, the present disclosure provides a computer-readable storage medium, a computer program is stored on the storage medium, and the computer program is configured to execute any one of the live-stream preview methods provided in the present disclosure.

The above description is only an explanation of the preferred embodiments of the present disclosure and the applied technical principles. It should be appreciated by those skilled in the art that the disclosure scope involved in the present disclosure is not limited to the technical solutions formed by specific combinations of the above technical features, but also encompasses other technical solutions formed by an arbitrary combination of the above technical features or their equivalent features without departing from the above disclosure concept. The other technical solutions are, for example, technical solutions formed by replacing the above features with technical features having functions similar to those disclosed (but not limited to) in the present disclosure.

Furthermore, while various operations are depicted in a specific order, this should not be understood as requiring that such operations be performed in the specific order shown or in a sequential order. Under certain circumstances, multitasking and parallel processing may be advantageous. Similarly, while several specific implementation details are included in the above discussion, these should not be construed as limitations on the scope of the present disclosure. Some features that are described in the context of separate embodiments can also be implemented in combination in a single embodiment. Conversely, various features that are described in the context of a single embodiment can also be implemented in multiple embodiments separately or in any suitable sub-combination.

Although the subject matter has been described in language specific to a structural feature and/or method logic action, it should be understood that the subject matter defined in the attached claims is not necessarily limited to the specific feature or action described above. Conversely, the specific feature and action described above are only exemplary forms for implementing the claims.

The invention claimed is:

1. A live-stream preview method, comprising:

displaying a promotion control on a first interface corresponding to a live-stream event created by a first user, wherein the promotion control is used for the first user to enable an event promotion function for the live-stream event, and the live-stream event is an event that is to be live-streamed;

in response to a trigger operation on the promotion control by the first user, switching a display state of the promotion control on the first interface corresponding to the live-stream event to display preview information of the live-stream event on a second interface, wherein the second interface is an interface of a video, and the video is posted by the first user;

wherein an event reservation entry is displayed in response to the preview information being triggered, and the live-stream event is reserved in response to the event reservation entry being triggered.

2. The method according to claim 1, wherein the displaying the promotion control on the first interface corresponding to the live-stream event created by the first user comprises:

displaying, in response to a first user's completing operation of a current newly-created live-stream event, guidance information for determining whether to add the event promotion function;

displaying, in response to an adding operation of the event promotion function in the guidance information, a first promotion control in a first preset region on a live-stream event page, wherein the first promotion control is used to indicate whether a server enables a promotion function for the current newly-created live-stream event, and the current newly-created live-stream event is a live-stream event that has been currently newly created and displayed on the live-stream event page.

3. The method according to claim 2, wherein after the displaying, in response to the adding operation of the event promotion function in the guidance information, the first promotion control in the first preset region on the live-stream event page, the method further comprises:

displaying a second promotion control in a second preset region on the live-stream event page, wherein the second promotion control is used to instruct the server whether to enable a promotion function for a subsequent newly-created live-stream event.

4. The method according to claim 1, wherein the displaying the promotion control on the first interface corresponding to the live-stream event created by the first user comprises:

displaying, in response to a viewing operation on a live-stream event list, a live-stream event list page created by the first user, wherein a first entry identifier is set on the live-stream event list page;

displaying, in response to a triggering operation on the first entry identifier, a third promotion control in a third preset region on the live-stream event list page, wherein the third promotion control is used to instruct a server whether to enable a promotion function for a subsequent newly-created live-stream event.

5. The method according to claim 4, wherein the live-stream event list page further comprises information of a plurality of live-stream activities, wherein information of each live-stream event is correspondingly provided with a second entry identifier, and the method further comprises:

displaying, in response to a triggering operation on the second entry identifier corresponding to information of any live-stream event, a fourth promotion control corresponding to the information of the live-stream event in a fourth preset region on the live-stream event list page, wherein the fourth promotion control is used to instruct the server whether to enable a promotion function for the information of the any live-stream event.

6. The method according to claim 4, further comprising:

displaying, for a live-stream event with an activated promotion control, a promotion identifier in a title region of the live-stream event on the live-stream event list page.

7. The method according to claim 1, wherein the in response to a trigger operation on the promotion control by the first user, switching a display state of the promotion control on the first interface corresponding to the live-stream event to display preview information of the live-stream event on the second interface, comprises:

obtaining a video show scene set by the first user;

instructing, in response to the trigger operation on the promotion control, a server to add the preview information of the live-stream event in a first target video, wherein the first target video is a video satisfying the video show scene.

8. The method according to claim 1, wherein the in response to a trigger operation on the promotion control by the first user, switching a display state of the promotion control on the first interface corresponding to the live-stream event to display preview information of the live-stream event on the second interface, comprises:

instructing a server to add an event link in the video posted by the first user, wherein the event link is associated with an event information page of the live-stream event; or, instructing the server to add a preview keyword of the live-stream event in the video posted by the first user; or, instructing the server to add an event link identified with a preview keyword of the live-stream event in the video posted by the first user, wherein the event link is associated with the event information page of the live-stream event.

9. The method according to claim 1, wherein the preview information of the live-stream event comprises:

preview information of a live-stream event with a start time closest to a current time; or, preview information of one or a plurality of live-stream activities with a distance between the start time and the current time being within a preset time period.

10. The method according to claim 1, wherein the method further comprises:

obtaining a video filtering scene set by the first user, and determining a second target video posted by the first user and satisfying the video filtering scene;

instructing a server to cancel adding the preview information of the live-stream event in the second target video.

11. The method according to claim 1, further comprising:

in response to the trigger operation on the promotion control, instructing a sever to add the preview information of the live-stream event in the video posted by the first user.

12. An electronic device, wherein the electronic device comprises:

a processor; and a memory, configured to store executable instructions of the processor;

wherein the processor is configured to read the executable instructions from the memory and execute the instructions to realize the live-stream preview method according to claim 1.

13. A non-transitory computer-readable storage medium, wherein a computer program is stored on the storage medium, and the computer program is configured to execute the live-stream preview method according to claim 1.

14. A live-stream preview method, comprising:

obtaining preview information of a live-stream event sent by a client, wherein the preview information of the live-stream event is generated by the client after receiving a triggering operation on a promotion control on a first interface corresponding to the live-stream event by a first user, wherein the promotion control is used for the first user to enable an event promotion function for the live-stream event, the live-stream event is an event that is to be live-streamed, wherein an event reservation entry is displayed in response to the preview information being triggered, and the live-stream event is reserved in response to the event reservation entry being triggered;

adding the preview information of the live-stream event to a video posted by the first user.

15. The method according to claim 14, wherein adding the preview information comprises:

adding the preview information of the live-stream event in a first target video, wherein the first target video comprises at least one of the following:

a video posted by the first user and satisfying a preset recommendation condition as the first target video;

a video shown on a personal information page of the first user as the first target video;

a video posted by the first user and satisfying a preset hotspot condition as the first target video.

16. The method according to claim 14, wherein the method further comprises:

displaying, in response to a triggering operation on an event link by a second user via a client, an event information page of the live-stream event corresponding to the event link, wherein the event link is associated with the event information page of the live-stream event.

17. The method according to claim 14, wherein the adding the preview information of the live-stream event in the video posted by the first user comprises:

adding an event link in the video posted by the first user, wherein the event link is associated with an event information page of the live-stream event; or, adding a preview keyword of the live-stream event in the video posted by the first user; or, adding an event link identified with a preview keyword of the live-stream event in the video posted by the first user, wherein the event link is associated with the event information page of the live-stream event; or, the method further comprises:

cancelling adding the preview information of the live-stream event in a second target video, wherein the second target video comprises at least one of the following:

a video posted by the first user and satisfying a preset filtering keyword as the second target video;

an event video stored in a target region on an event detail page of the live-stream event as the second target video.

* * * * *